United States Patent
Blelloch et al.

(12)

(10) Patent No.: US 6,434,590 B1
(45) Date of Patent: *Aug. 13, 2002

(54) METHODS AND APPARATUS FOR SCHEDULING PARALLEL PROCESSORS

(75) Inventors: Guy E. Blelloch, Pittsburgh, PA (US); Phillip B. Gibbons, Westfield, NJ (US); Yossi Matias, Tel Aviv (IL); Girija J. Narlikar, Pittsburgh, PA (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,873

(22) Filed: Apr. 1, 1998

Related U.S. Application Data

(63) Continuation-in-part of application No. 08/502,625, filed on Jul. 14, 1995, now Pat. No. 5,768,594.

(51) Int. Cl.⁷ .................................................. G06F 9/00
(52) U.S. Cl. ........................................ 709/102; 709/106
(58) Field of Search ............................. 712/1; 709/106, 709/102, 1

(56) References Cited

U.S. PATENT DOCUMENTS

| | | | | |
|---|---|---|---|---|
| 4,521,874 A | * | 6/1985 | Rau | 365/221 |
| 5,155,858 A | | 10/1992 | DeBruler | 709/105 |
| 5,241,677 A | * | 8/1993 | Naganuma | 709/105 |
| 5,325,525 A | * | 6/1994 | Shan | 709/104 |
| 5,325,526 A | | 6/1994 | Cameron | 709/102 |
| 5,347,654 A | | 9/1994 | Sabot | 717/9 |
| 5,349,656 A | | 9/1994 | Kaneko | 709/102 |
| 5,392,429 A | * | 2/1995 | Agrawal | 395/650 |
| 5,442,792 A | | 8/1995 | Chun | 717/6 |
| 5,481,747 A | * | 1/1996 | Kametani | 709/102 |
| 5,768,594 A | | 6/1998 | Blelloch et al. | 717/6 |
| 5,889,989 A | * | 3/1999 | Robertazzi | 709/105 |

* cited by examiner

Primary Examiner—Eric Coleman

(57) ABSTRACT

A parallel processing method involves the steps of determining a sequential ordering of tasks for processing, assigning priorities to available tasks on the basis of the earliest and then later in the sequential ordering, selecting a number of tasks greater than a total number of available parallel processing elements from all available tasks having the highest priorities, partitioning the selected tasks into a number of groups equal to the available number of parallel processing elements, and executing the tasks in the groups in the parallel processing elements. The determining step establishes an ordering with a specific predetermined sequential schedule that is independent of the parallel execution, and the assigning step assigns priorities for parallel execution on the basis of the sequential schedule that is independent of the parallel execution.

34 Claims, 9 Drawing Sheets

METHODS AND APPARATUS FOR SCHEDULING PARALLEL PROCESSORS

REFERENCE TO APPLICATIONS

This is a continuation-in-part of U.S. application Ser. No. 08/502,625, filed Jul. 14, 1995 now U.S. Pat. No. 5,768,594, entitled "Method and Means for Scheduling Parallel Processors", and is incorporated herein as if fully recited in this application.

FIELD OF THE INVENTION

This invention relates to methods and means for scheduling tasks performed by parallel processors, and particularly to concurrent execution of operations in a number of functional units in cooperation with an assignment manager.

BACKGROUND OF THE INVENTION

Traditional data processing systems execute a sequence of instructions one at a time. To increase the execution speed of computers, multiple processors are used to perform parallel processing of primitive operations, or tasks. Such parallelism often requires substantially more space (memory) than sequential operations.

Many parallel programming languages allow for parallel processing in separate functional units. The goal of these languages is to have the user expose the full parallelism and have the language implementation schedule the parallelism onto processors. Costs of such operations can be measured abstractly in terms of the total number of operations executed by the program, i.e. the "work", and the length of the longest sequence of dependencies, the i.e. the "depth". Performance anomalies in such arrangements are often common. Heuristics used in the implementation often fail. Such systems do not necessarily offer good performance, both in terms of time and space.

The aforementioned application Ser. No. 08/502,625, filed Jul. 14, 1995, involved determining sequential ordering of tasks for processing, assigning priorities to the tasks available on the basis of the sequential ordering, selecting a number of tasks greater than a total number of available processing elements from all available tasks having the highest priorities, partitioning the selected tasks into a number of groups equal to the available number of parallel processing elements, and processing the tasks in the parallel processing elements.

The processing elements in the latter application have buffers and operate in synchronism. An assignment manager pushes tasks into the buffers of each processing element.

SUMMARY OF THE INVENTION

In an embodiment of the invention, the assignment manager makes live tasks available and the processing elements extract the tasks and keep executing the tasks and upon reaching a criterion (time, memory etc.) each element feeds information back to the assignment manager and extracts more tasks. The assignment manager establishes the criterion and determines task priorities on the basis of a sequential schedule independent of the execution of the extracted tasks in the processing elements.

The various aspects of the invention are pointed out in the claims. Other objects and advantages of the invention will become evident when read in light of the accompanying drawings.

BRIEF DESCRIPTION OF THE DRAWINGS

FIG. 3 is a block diagram illustrating details of processing elements in FIGS. 2 and 2a.

FIG. 7 shows details of the assignment manager, and FIG. 7A shows details of the processing elements.

FIG. 9 shows details of the assignment manager and FIG. 9A shows details of a processing element.

DETAILED DESCRIPTION OF PREFERRED EMBODIMENTS

Figure 1:
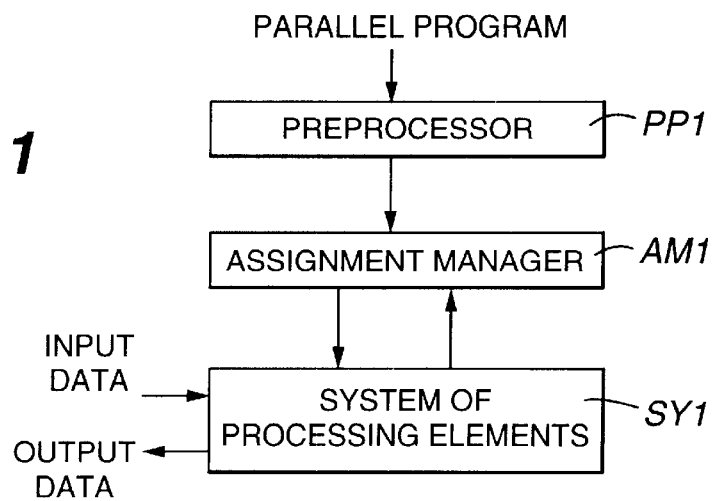
FIG. 1 is a block diagram of an system embodying the invention.

FIG. 1 illustrates an embodiment of the invention as a block diagram. Here, a preprocessor PP1 translates (compiles) an incoming program into a suitable form for execution, for example, machine-level instructions. According to an embodiment of the invention, the preprocessor PP1 is optional and may be omitted. The incoming program may be any sequential program that takes the form of some programming language that reveals the tasks to be performed by parallel processing but not the assignment (or mapping) of tasks to processors. The program may be such that the set of tasks and the relationships between them are determined by (dependent on) the program's input data, and so are revealed only during the parallel processing of the program on its input data.

Figure 2:
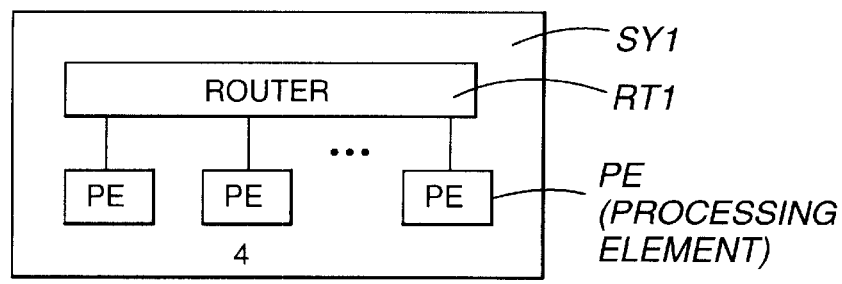
FIG. 2 is a block diagram illustrating details of a processing element array of FIG. 1.

An assignment manager AM1 determines tasks available for scheduling and assigns a subset of these tasks to a system SY1 containing processing elements PE1 and router RT1 shown in FIG. 2. Specifically, the assignment manager AM1 supplies a set of available tasks and makes them available to each processing element PE1. Each processing element PE1 then takes (draws, or extracts) a task as it becomes available through the router RT1 which routes the set of tasks made available by the assignment manager AM1.

Each processing element PE1 in the system SY1 executes the instructions of the tasks drawn (i.e. extracted) from the assignment manager into its task buffer, and informs the assignment manager AM1 when tasks are completed. Each processing element PE1 continues to draw and execute tasks as long as there are tasks to be executed. The assignment manager AM1 proceeds as long as there are more program tasks to be executes and as long as the program is not completed.

The processing elements PE1 receive input data upon which the tasks of the parallel program operate. The processing elements PE1 then output program output data. The rate at which the processing elements PE1 draw tasks from the assignment manager AM1 is determined by the processing elements, as follows. A processing element PE1 draws tasks from the assignment manager AM1 and executes these tasks. In the course of executing a task, a processing element PE1 may generate a new task. It continues to execute tasks and new tasks until either all such tasks have completed or a predetermined time, memory, or other criterion has been exceeded. At this point, the processing element PE1 informs the assignment manager AM1 of completed tasks and new tasks, and again draws tasks from the assignment manager AM1.

Figure 2A:
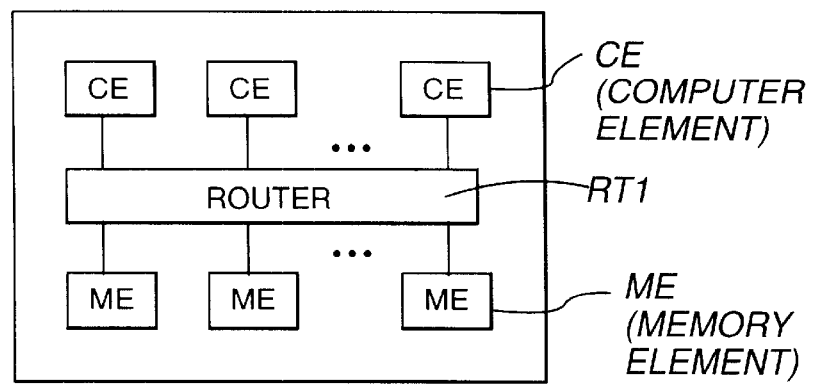
FIG. 2a is a block diagram of another embodiment of the processing array in FIG. 1.

FIG. 2a illustrates another embodiment of the system SY1 of FIG. 2. Here, the functions of the processing elements PE1 are divided into computation elements CE and memory elements ME. The router RT1 again routes the tasks which the processing elements draw from the assignment manager AM1 to the processing elements PE1 in the form of computation elements CE and memory elements ME. Each computation element CE reads and writes locations in any memory element ME (or possibly only a subset of the memory elements ME) via the router RT1.

Figure 3:
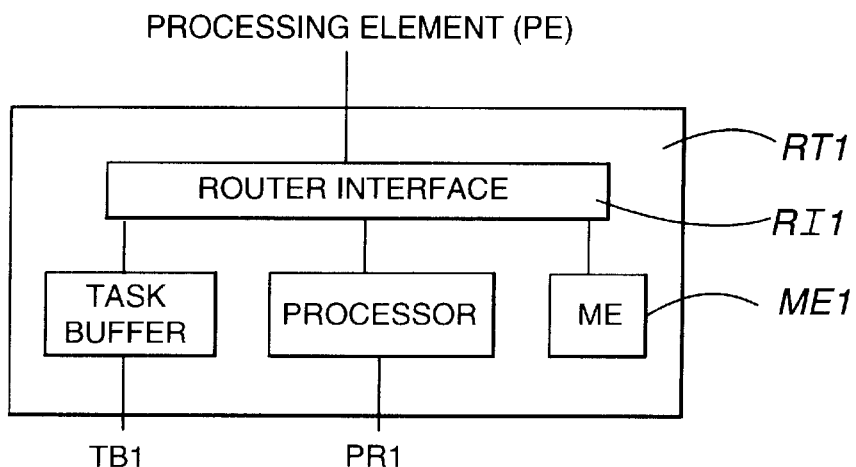

FIG. 3 illustrates details of the processing elements PE1. Here, a router interface RI1 in connects to a task buffer TB1, a processor PR1, and a memory ME1 all coupled to each other. Tasks are pulled by the processing elements PE1 into the task buffer TB1 from the assignment manager AM1. Whenever the processor PR1 is idle, it removes a task from the task buffer TB1, and executes it.

A feedback exists from the processing element PE1 to the assignment manager AM1 regarding the completed execution of tasks and the generation of new tasks. According to one embodiment of the invention such feedback occurs when the processing element PE1 reaches a criterion, e.g. runs out of time or memory, or completes all its tasks. The processing element PE1 then sends an acknowledgement and a list of new tasks to the assignment manager AM1 via its router RT1. According to another embodiment the processing element PE1 places the acknowledgment and new tasks in a separate task buffer which can be read by the assignment manager.

The memory element ME1 contains the memory available to the processor PR1. In the preferred embodiment, a processor reads and writes certain locations in the memory elements ME1 residing in other processing elements PE1 by communicating via the router RT1. The task buffer TB1 can reside within the memory element ME1 or form a separate memory device.

Figure 4:
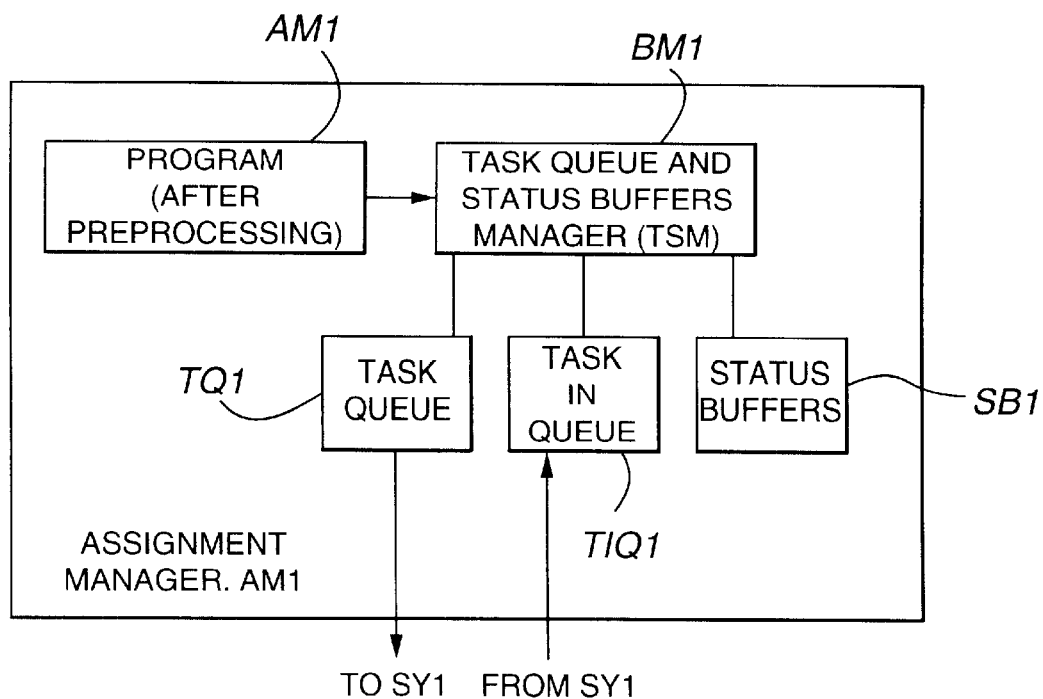
FIG. 4 is a block diagram of an assignment manager In FIG. 1.

Details of the assignment manager AM1 of FIG. 1 appear in FIG. 4. Here a task queue TQ1 contains a set of tasks available for scheduling (not necessarily all such tasks). The processing elements PE1 pull or draw a set of zero or more tasks in the task buffer TB1 for each processing element PE1.

A task queue and status buffers manager (TSM) BM1 adds tasks to the task queue TQ1. The task queue and status buffers manager BM1 uses the task queue TQ1 and status buffers SB1 to determine tasks available for scheduling. The status buffers SB1 include the necessary information on the relationship between tasks, e.g., tasks that need to synchronize upon completion. The task in queue TIQ1 is used to store feedback information that arrives from the processing elements PE1 via the router RT1. The task queue and status buffers manager BM1 uses the program and feedback information obtained from the system SY1 of processing elements PE1 to update the task queue TQ1 and the status buffers SB1.

A task is "available" if it has no precedent that must be accomplished before execution of that task. That is, some tasks cannot be executed until one or more preceding tasks have been completed. Such a task is said to have a precedent restraint or be blocked. Such a task becomes "available" upon completion of the all its preceding restraining tasks. Some tasks, at the outset, have no precedents that require completion.

Such tasks are available at the start. An uncompleted task is "live" if it is available or it has been generated by the execution of other tasks.

Sequential programs intended for use with a single processor usually employ a sequential scheduler that designates each task of a program with a code or characterization that identifies the ordering of the task in the sequence of instructions. Thus each task has a designation identifying its order in the schedule.

The invention utilizes the ordering of tasks in the sequential scheduling to select a subset of the available tasks for parallel processing. That is, the invention selects a subset of available tasks for parallel processing by assigning higher priorities to the earlier available tasks in the sequential schedule.

Figure 5:
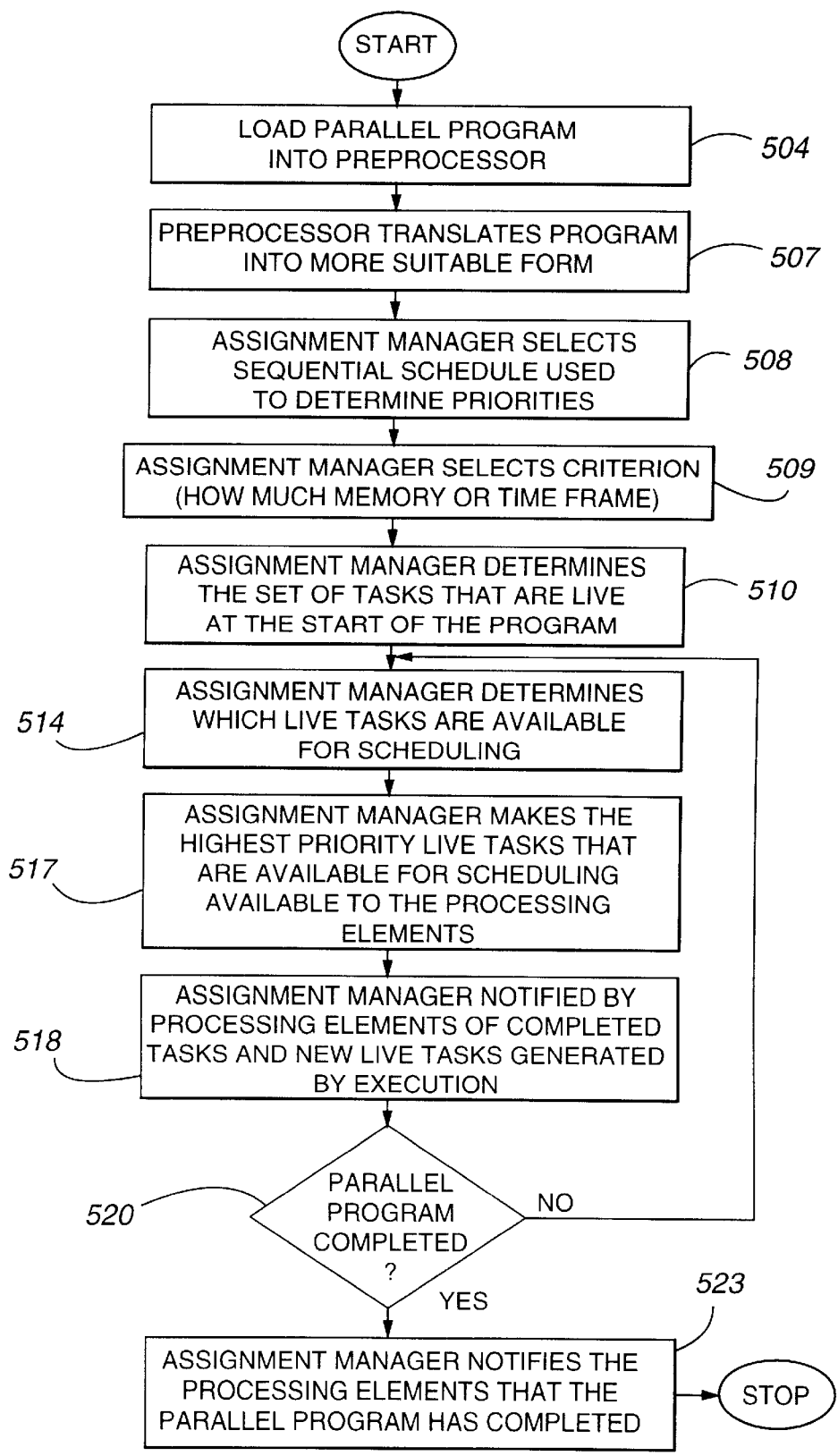
FIG. 5 is a flow chart of the operation of a preprocessor and the assignment manager of FIGS. 1 to 4.
Figure 6:
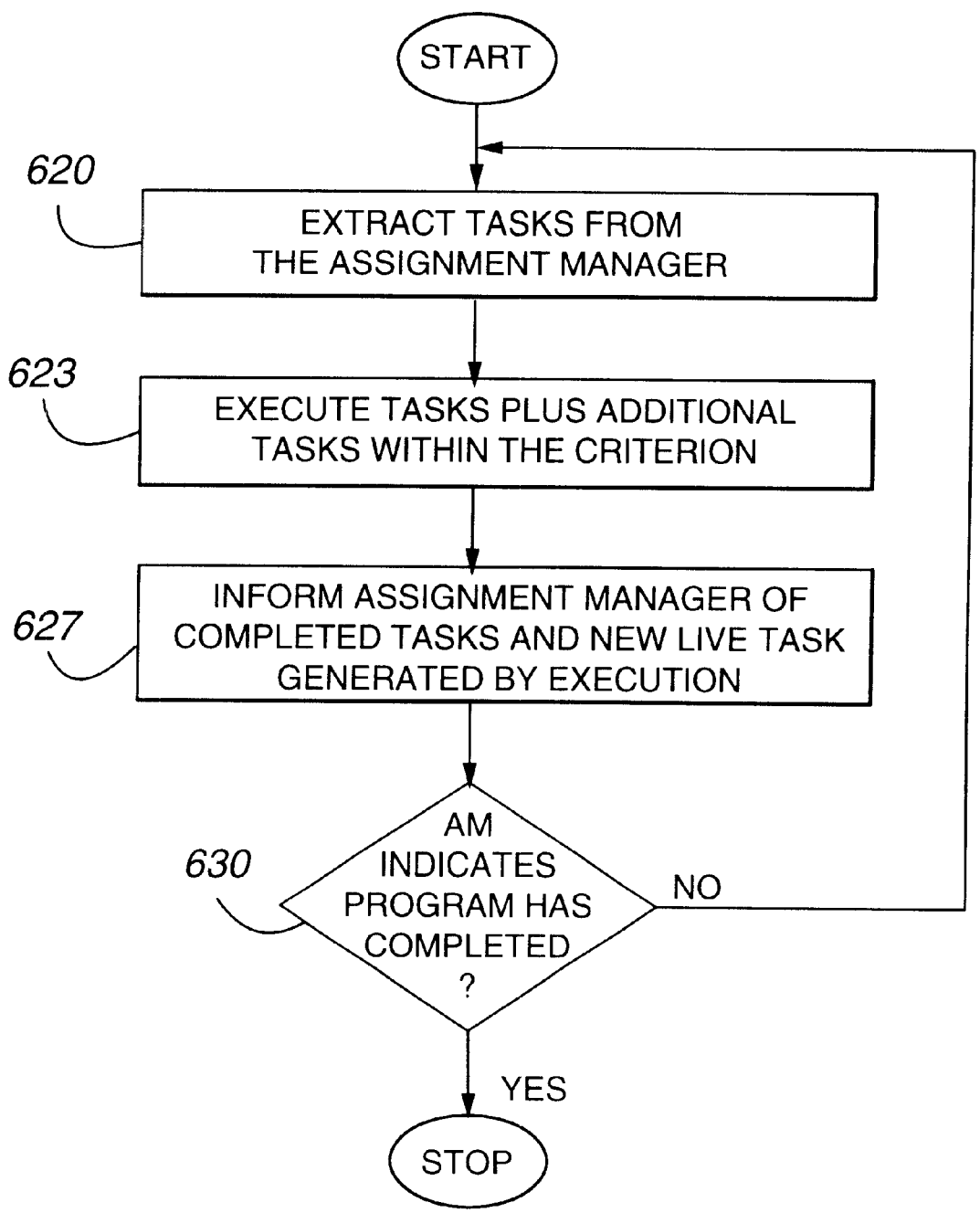
FIG. 6 is a flow chart of operation of each processing element.

FIGS. 5 and 6 show the flow chart of the operations of FIGS. 1 to 4. FIG. 5 shows the operation of the preprocessor PP1 and the assignment manager AM1. Here, in step 504, the program is loaded into the preprocessor PP1. In step 507, the preprocessor PP1 translates the program into a form suitable for the particular elements in the system. In step 508, a particular sequential scheduler is selected for use in determining priorities among tasks. The scheduler determines an ordering among all the tasks in the program. The scheduler is of a known type such as a DF (depth first) scheduler. Depth first schedulers are discussed below under "Theory". The sequential scheduler serves not only for those tasks that are now available for scheduling, but for all the tasks as determined by a sequential execution of the program that is independent of the parallel execution in the processing elements.

In step 509, a criterion, such as time or memory is selected. The criterion establishes a time or memory limit for the operation of each processing element PE1 on its tasks before it must provide feedback to the assignment manager AM1 and draw tasks from TQ1. The assignment manager AM1, in step 510, determines the tasks that are live at the start of the program. In step 514, the assignment manager AM1 determines which live tasks are available for scheduling, and in step 517, makes the highest priority available tasks available to be drawn by the processing elements. In the meantime, the processing elements PE1 draw tasks from the assignment manager, execute the tasks and provide feedback to the task in queue TIQ1 of the assignment manager AM1, as shown in FIG. 6 (discussed below). In step 518, the assignment manager retrieves the feedback information from the task in queue TQ1. The assignment manager AM1, in step 520, asks whether the parallel program is complete. If the answer is yes, the assignment manager AM1, in step 523, informs the processing elements that the parallel program has completed and stops the operation; if no, the assignment manager returns to step 514.

FIG. 6 shows the operation of each processing element PE1. In step 620, the processing element requests from the assignment manager AM1 via the router RT1 some number of tasks from the head of the task queue TQ1, and receives the tasks via the router RT1. In seep 623, the processing element PE1 executes the tasks. In the course of executing the tasks, the processing elements PE1 may generate new live tasks. It continues to execute tasks and new tasks until either all such tasks have completed or a predetermined time, memory, or other criterion has been exceeded. At this point, in step 627, the processing element PE1 informs, via the router RT1, the assignment manager AM1 of completed tasks and new live tasks, appending this feedback to the tail of the Task In Queue TIQ1. The processing element PE1, in step 630, asks the assignment manager AM1 whether the parallel program is complete. If the answer is yes, the processing element stops its operation; if no, the processing element returns to step 620.

According to one embodiment of the invention, the assignment manager AM1 includes a number of processing elements which may operate in parallel. The assignment manager AM1 then performs its functions in each step of FIG. 5 in a small number of parallel steps. Otherwise it performs its functions in ordinary sequence. According to another embodiment, the steps of tho assignment manager are performed by the same processing elements as those used to execute the tasks.

All of the processing elements operate separately without being in synchronism. This permits flexibility and more efficient operation.

Figure 7:
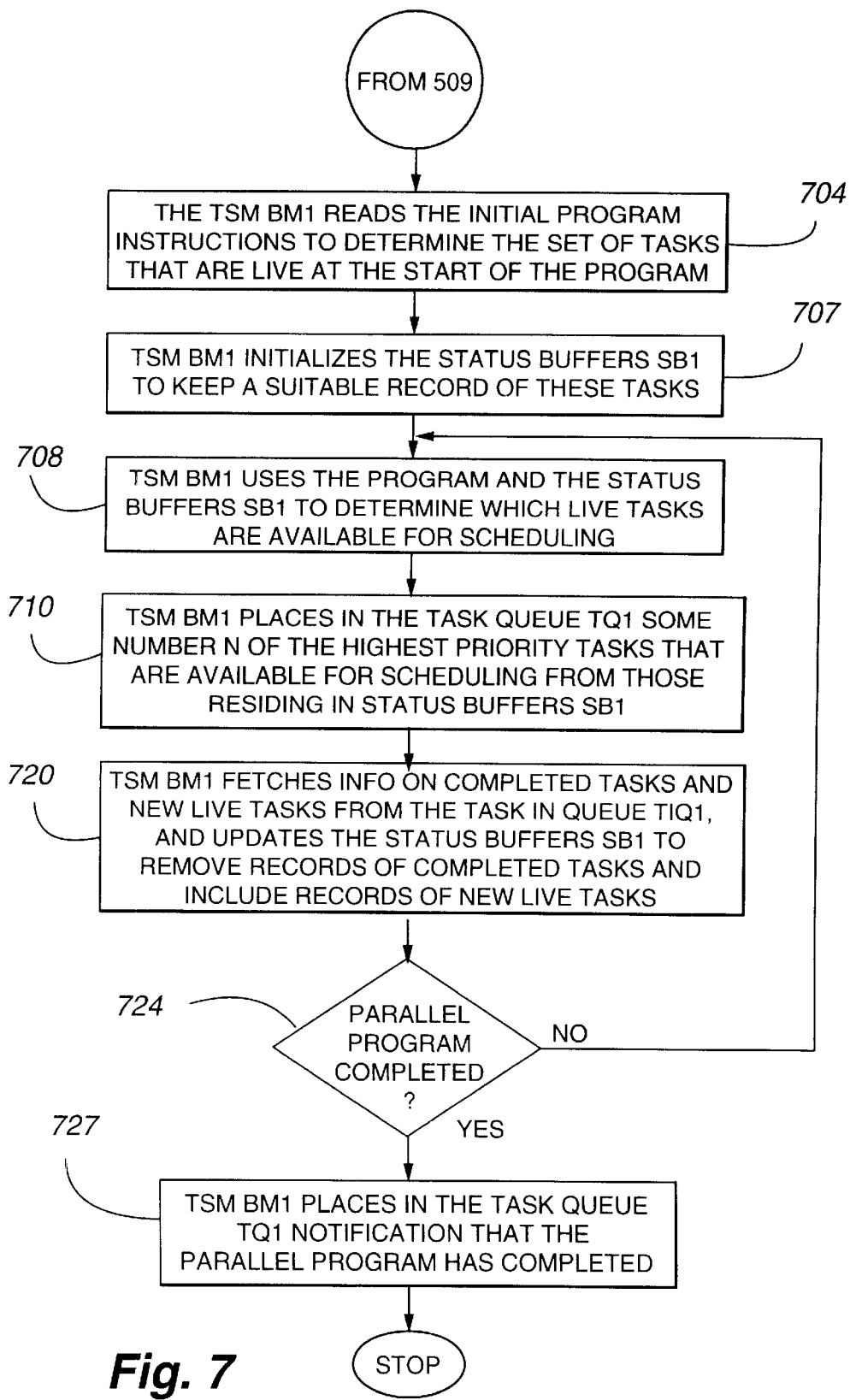
FIG. 7 and FIG. 7A are more detailed flow charts of the system.
Figure 7A:
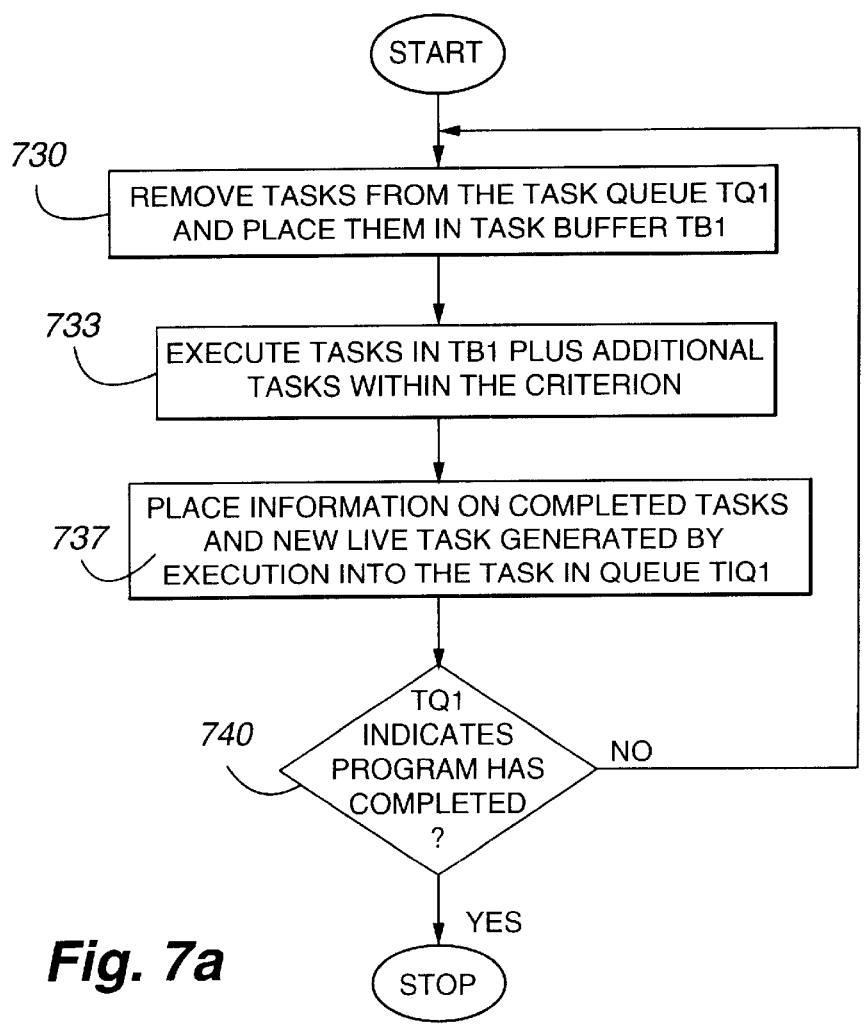

FIG. 7 is a flow chart of another embodiment of the invention and shows details of the operation of the Assignment manager AM1. In step 704, the task queue and buffers manager BM1 of FIG. 4 in the assignment manager AM1 reads the initial program instructions to determine the set of tasks that are live at the start of the program. In step 707, the task queue and buffers manager BM1 then initializes the status buffers SB1 to keep a suitable record of these tasks. In step 708, the task queue and buffers manager BM1 uses the program and the status buffers SB1 to determine which live tasks are available for scheduling. In step 710, the task queue and buffers manager BM1 places in the task queue TQ1 some number of the highest priority available tasks from those residing in status buffers SB1. The priorities are determined according to the sequential scheduler selected in step 508. In the meantime, the processing elements PE1 draw tasks from TQ1, execute the tasks, and provide feedback in the task in queue TIQ1 of the assignment manager AM1, as shown in FIG. 7A (discussed below. In step 720, the task queue and buffers manager BM1 reads the feedback information from the task in queue TIQ1, to learn of completed tasks and new live tasks, and updates the status buffers SB1 to remove records of completed tasks and include records of new live tasks. In step 724, the task queue and buffers manager BM1 uses the parallel program and the records in the status buffers SB1 to determine if all tasks in the parallel program have been completed. If yes, the task queue and buffers manager BM1 places in the task queue TQ1 notification that the parallel program has completed (e.g., an end-of-program marker) and the operation ends, if no, the operation returns to step 708.

FIG. 7A is the flow chart of another embodiment of the invention and shows details of the operation of each processing element PE1. In step 730, the processing element PE1 requests from the assignment manager AM1 via the router RT1 some number of tasks from the head of the task queue TQ1, receives the tasks via the router RT1, and places the tasks in its task buffer TB1. In step 733, the processing element PE1 executes the tasks in TB1. In the course of executing the tasks, the processing elements PET may generate new live tasks. It continues to execute tasks and new tasks until either all such tasks have completed or a predetermined time, memory, or other criterion has been exceeded.

At this point, in step 737, the processing element PE1 informs, via the router RT1, the assignment manager AM1 of completed tasks and new live tasks, appending this feedback to the tail of the Task In Queue TIQ1. The processing element PE1, in step 740, checks the task queue TQ1 to see whether there is notification that the parallel program has completed. In another embodiment, this check is only performed if PE1 has completed all its tasks. In yet another embodiment, the processing element requests some number of tasks and receives instead an end-of-program marker if the parallel program is completed. If the processing element PE1 receives notification that the program has completed, the processing element stops its operation; if not, the processing element returns to step 730.

Figure 8:
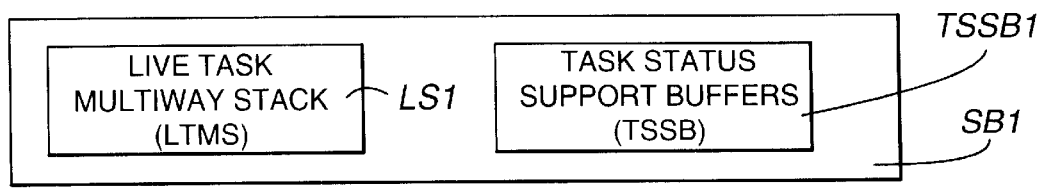
FIG. 8 is a block diagram of a portion of FIG. 4.

FIG. 8 illustrates an embodiment of the status buffers SB1 in FIG. 4. Here a status buffer SB1 includes a live task multiway stack (LTMS) LS1 and task status support buffers (TSSB) TSSB1. These are used in the embodiment of the operation of the assignment manager AM1 shown in FIGS. 9 and 9A.

Figure 9:
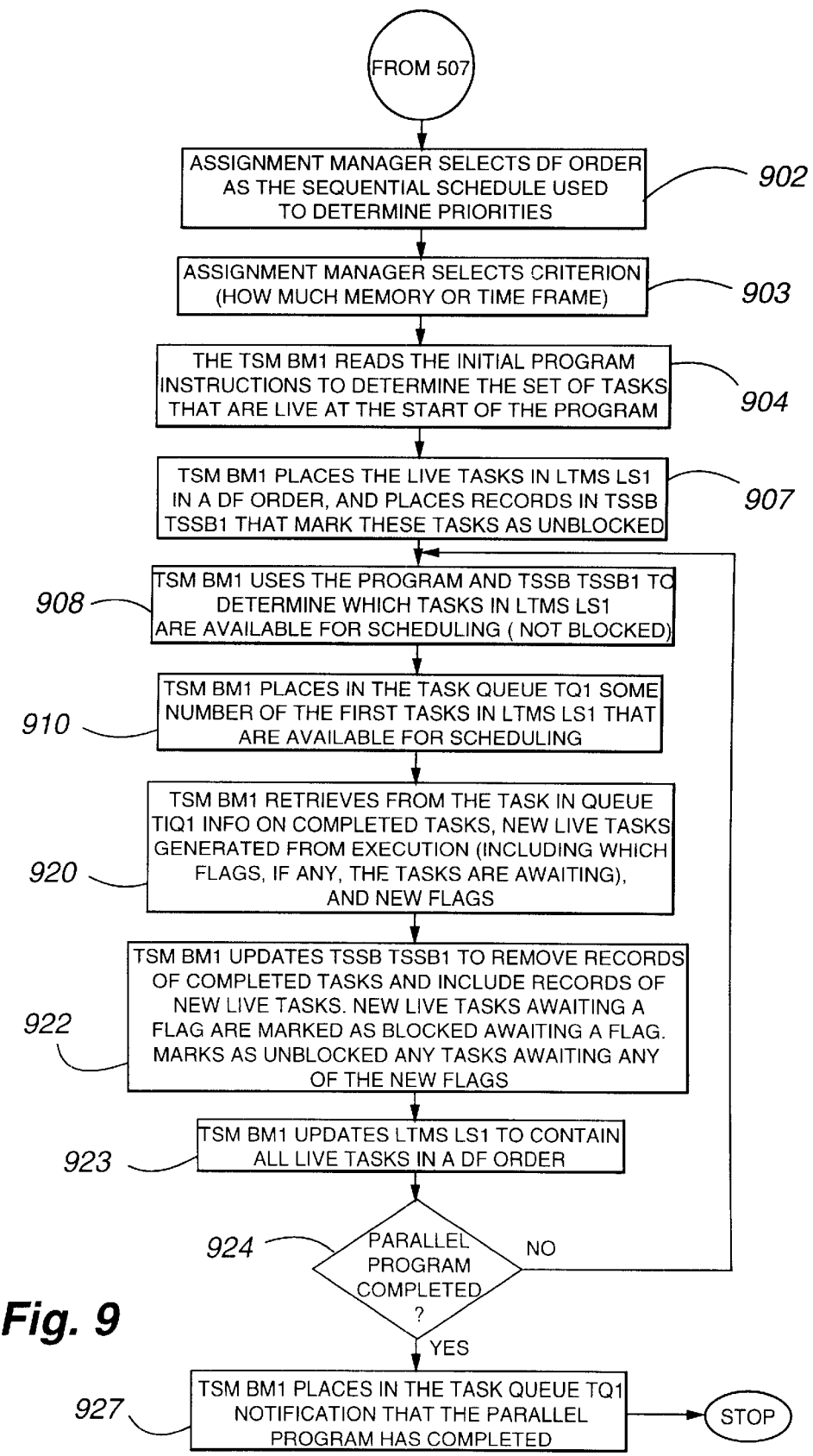
FIGS. 9 and 9A are flow charts of another embodiment of the operation of the system.
Figure 9A:
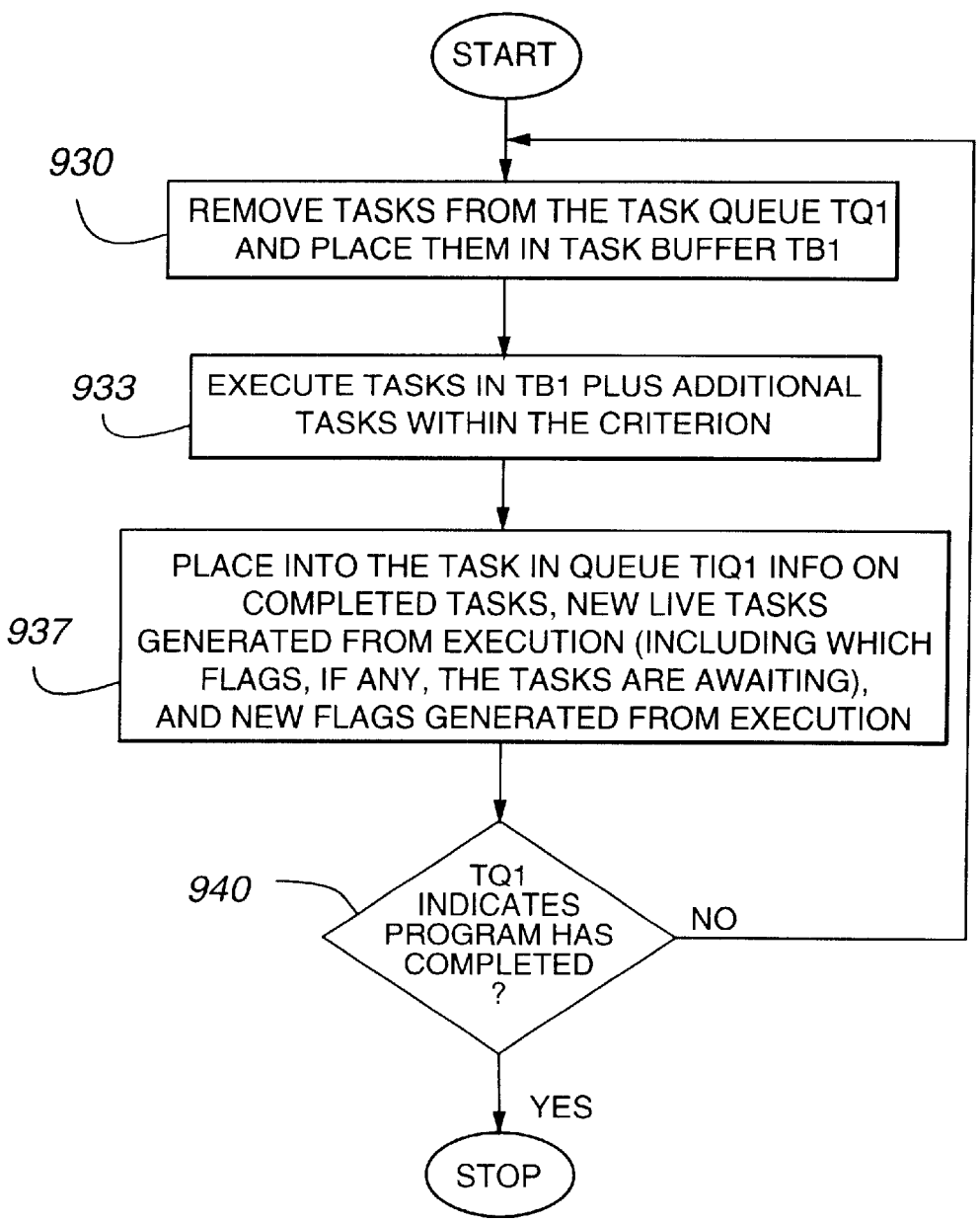

FIGS. 9 and 9A are flow charts of another embodiment of the operation of the system. FIG. 9 shows details of the assignment manager AM1 FIG. 9A shows details of the processing element PE1. In step 902, the assignment manger AM1 selects the DF order for use in determining priorities among tasks. In step 903, the assignment manager AM1 selects a criterion, such as time or memory. The criterion establishes a time or memory limit for the operation of each processing element PE1 on its tasks before it must provide feedback to the assignment manager AM1 and draw tasks from TQ1. In step 904, the task queue and buffers manager BM1 of FIG. 4 in the assignment manager AM1 reads the initial program instructions to determine the set of tasks that are live at the start of the program. In step 907, the task queue and buffers manager BM1 places the live tasks in the live task multiway stack LS1 in a DF order, and places records in the task status support buffers TSSB1 that mark these tasks as unblocked. In step 908, the task queue and buffers manager BM1 uses the program and the task status support buffers TSSB1 to determine which live tasks are available for scheduling (i.e., they are marked as unblocked). In step 910, the task queue and buffers manager BM1 places in the task queue TQ1 some number of the first tasks in the live task multiway stack LS1 that are available for scheduling.

In the meantime, the processing elements PE1 draw tasks from TQ1, execute the tasks, and provide feedback in the task in queue TIQ1 of the assignment manager AM1, as shown in FIG. 9A (discussed below). In step 920, the task queue and buffers manager BM1 reads the feedback information from the task in queue TIQ1, to learn of completed tasks, new live tasks generated from execution, and new flags. For each new live task, the feedback information indicates which flag, if any, the task is awaiting. In step 922, the task queue and buffers manager BM1 updates the task status support buffers TSSB1 to remove records of completed tasks and include records of new live tasks. New live tasks awaiting a flag are marked in the task status support buffers TSSB1 as blocked awaiting a flag. For each new flag, the task queue and buffers manager BM1 marks in the task status support buffers TSSB1 as unblocked any task awaiting the flag. In an alternative embodiment, a single task may be blocked awaiting more than one flag, and the task is marked as unblocked only if all such flags are among the new flags. In step 923, the task queue and buffers manager BM1 updates the live task multiway stack LS1 to contain all live tasks in a DF order. In step 924, the task queue and buffers manager BM1 uses the parallel program and the records in the task status support buffers TSSB1 to determine if all tasks in the parallel program have been completed. If yes, the task queue and buffers manager BM1, in step 927, places in the task queue TQ1 notification that the parallel program has completed (e.g., an end-of-program marker) and the operation ends, if no, the operation returns to step 908.

FIG. 9A is the flow chart of another embodiment of the invention and shows details of the operation of each processing element PE1. In step 930, the processing element PE1 requests from the assignment manager AM1 via the router RT1 some number of tasks from the head of the task queue TQ1, receives the tasks via the router RT1, and places the tasks in its task buffer TB1. In step 933, the processing element PE1 executes the tasks in TB1. In the course of executing the tasks, the processing elements PE1 may generate new live tasks and new flags. It continues to execute tasks and new tasks until either all such tasks have completed or are blocked awaiting a flag, or a predetermined time, memory, or other criterion has been exceeded. At this point, in step 937, the processing element PE1 informs, via the router RT1, the assignment manager AM1 of completed tasks, new live tasks, and new flags, appending this feedback to the tail of the Task In Queue TIQ1. For each new live task, the feedback information indicates which flag, if any, the task is awaiting. The processing element PE1, in step 940, checks the task queue TQ1 to see whether there is notification that the parallel program has completed. In another embodiment, this check is only performed if PE1 has completed all its tasks. In yet another embodiment, the processing element requests some number of tasks and receives instead an end-of-program marker if the parallel program is completed. If the processing element PE1 receives notification that the program has completed, the processing element stops its operation; if not, the processing element returns to step 930.

The steps taken by the assignment manager may overlap the steps taken by the processing elements. Neither the assignment manager nor the processing elements need wait for the other to become idle before taking their respective steps.

Figure 10:
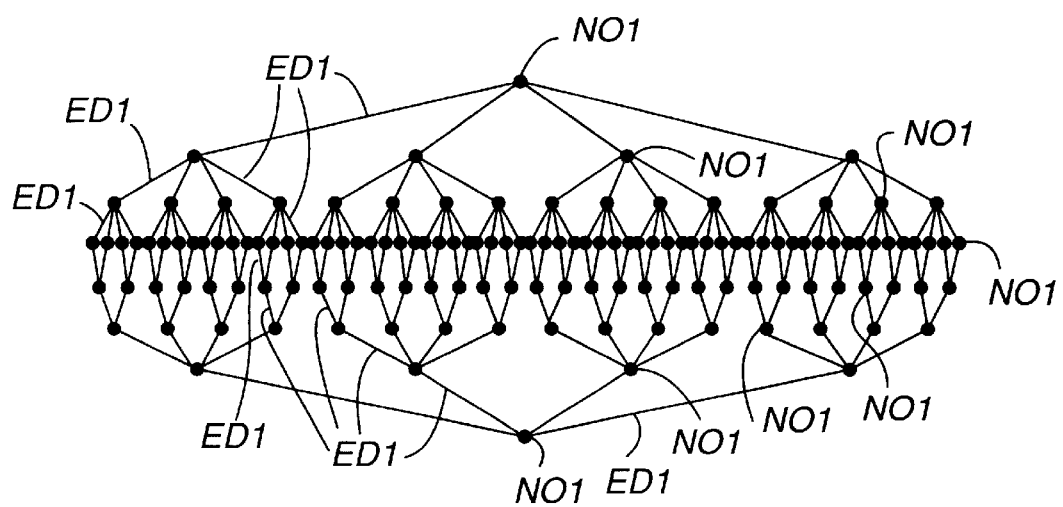
FIG. 10 illustrates the task structure of an example parallel program for multiplication of two N×N matrices, where N=4.

FIG. 10 illustrates the task structure of an example of a parallel program for multiplication of two N×N matrices, where N=4, represented as a directed acyclic graph. Nodes NO1 represent unit-work tasks, and edges ED1 (assumed to be directed downward in the figure) represent control and/or data flow between the tasks.

According to other embodiments of FIGS. 1 to 4, the assignment manager AM1 can have a sequential (centralized) or parallel (distributed) implementation. A parallel implementation is executed on the system SY1 of processing elements PE1 or on a separate system. The operation of status buffers manager BM1 can be executed by the processor elements PE1 or by a separate set of parallel processors, and the task queue TQ1 and the status buffers SB1 can be implemented in the task queue and status buffers manager BM1 or in separate memory devices. The elements of FIGS. 1 to 4 may be in the form of discrete structures or may be processors or parts of processors that perform the required functions.

According to other embodiments, the criterion is the number of operations completed or the number of tasks completed.

The invention achieves reduced parallel-processing memory requirements by selecting a subset of available tasks for parallel processing and assigning higher priorities to the earlier available tasks in the sequential schedule. The process of the invention applies groups of tasks to the parallel processing elements on the basis of their priorities.

When the process at any stage spawns new tasks, they take the place in the schedule ordering of the parent tasks that spawned them. According to another embodiment of the invention, the ordering in the sequential schedule reserves spots for spawned tasks, and the spawned tasks are placed in those spots.

Instead of the processing elements operating synchronously, they are allowed to operate asynchronously and the assignment manager deals with each ode separately. In these embodiments, a criterion is determined by memory or time etc. The criterion establishes a time or memory limit for the operation of each processing element PE1 on its tasks before it must provide feedback to the assignment manager AM1 and draw tasks from TQ1. The assignment manager makes the tasks available for the processing elements within a data structure and processing elements then take the task as they become available. The system is a pull rather than a push system. The processors pull from the assignment manager. Some tasks, called blocked tasks are all ready to go except they need a flag from another task. A blocked task is one that is not ready because it needs some data from a completed task. The data is in the form of a flag which makes the blocked task ready.

Live tasks may be either available for scheduling or blocked awaiting a flag. At the start of the program, all live tasks are available for scheduling. Only available tasks are placed into task queue TQ1 for execution. Each task that is executed by a processing element may generate one or more new live tasks (some of which may be blocked). It may also produce one or more flags. The processing elements inform the assignment manager of both new live tasks and new flags. The assignment manager adds the new tasks to the set of live tasks. For each new task that is blocked awaiting a flag F, if there is already a list of tasks for F, it adds the new task to the list. Otherwise, it creates a list of tasks for F with the new task as the only task in the list. For each new flag F, the assignment manager marks all tasks in the list for F as available for scheduling (i.e., no longer blocked), and deletes the list.

A synchronization variable is so called because it forces the task waiting for a flag to wait until it receives the flag. The flag and the In synchronization variable are exactly the same if you allow for a flag to include a value. The flags come from other processing elements so that the processing elements in effect synchronize themselves with each other. Synchronization elements or flags are necessary because you have two calculations going on which ultimately will depend upon each other. The flags are used to cause one calculation to wait until the other calculation has been completed so that they can be merged with each other. Flags permit waiting for a task that had been completed at a later stage in a directed acyclic graph as in FIG. 10. They enable synchronizing to a task that was scheduled at a much later point. Operation with synchronization variables requires the steps for selecting tasks available for scheduling and for maintaining the tasks in priority order.

An embodiment of the invention involves selecting, in an assignment manager, a sequential schedule to determine priorities for processing; assigning, in the assignment manager, live tasks available for scheduling according to priorities on the basis of the sequential schedule; making, in the assignment manager, the highest priority live tasks that are available for scheduling available for processing by parallel processing elements; extracting, by said processing elements, available tasks for processing into each of said processing elements; and executing tasks from the extracted tasks in each of the processing elements; the sequential schedule and determining of priorities being independent of the execution of the extracted tasks in the processing elements; said defining step including choosing an operating criterion for execution of the extracted tasks in the processing elements; and the executing of tasks in each of said processing elements including executing extracted tasks until the criterion is reached and then feeding information concerning the execution to the assignment manager.

THEORY

The above is based on the following. A depth-first 1-traversal (DF order, DFT or 1-DFT) is obtained by maintaining a stack of ready nodes (i.e., live nodes that are available for scheduling): the stack contains the root nodes initially (in any order), and at each step, the top node on the stack is popped from the stack and scheduled, and then any newly ready nodes are pushed on the front of the stack (in any order). The "i"th node in a DFT is said to have DFT number "i".

For parallel schedules based on sequential ones, we define a "p"-traversal, "Tp", to be based on a 1-traversal, "T1", if, at each step "i" of "Tp", the "Ki" earliest nodes in "T1" that are ready at step "i" are scheduled, for some "Ki≦p". In other words, for all ready nodes "u" and "v", if "u" precedes "v" in "T1", then either both are scheduled, neither are scheduled, or only "u" is scheduled.

Recent work on scheduling has resulted in provable bounds on the space taken by parallel computations in relation to the space taken by sequential computations. The results for online versions of these schedules, however, have been limited to situations in which threads can only synchronize with ancestor or sibling threads. Such computations do not include languages with futures or user-specified synchronization constraints. Here the results are extended to languages with synchronization variables. Such languages include languages with futures, such as Multilisp and Cool, as well as other languages such as ID.

The main result is an online scheduling which, given w work (total operations), σ synchronizations, d depth (critical path) and $s_1$ sequential space, will run in $O(w/p+\sigma log(pd)/p+d$ log (p d)) time and $s_1+O(pd$ log (pd)) space, on a p-processor CRCW PRAM with a fetch-and-add primitive. This includes all time and space costs for both the computation and the scheduler. The scheduler is non-preemptive in the sense that it will only move a thread if the thread suspends on a synchronization, forks a new thread, or exceeds a threshold when allocating space. For the special case where the computation is a planar graph with left-to-right synchronization edges, the scheduling can be implemented in $O(w/p+d$ log p) time and $s_1+O(pd$ log p) space. These are the first non-trivial space bounds described for such languages.

The purpose is to extend the results to support synchronization based on write-once synchronization variables. A "write-once synchronization variable" is a variable (memory location) that can be written by one thread and read by any number of other threads. If it is read before it is written, then the reading thread is suspended until the variable is written. Pointers to such synchronization variables can be passed around among threads and synchronization can take place between two threads that have pointers to the variable. Such synchronization variables can be used to implement futures in such languages as Multilisp, Cool, and OLDEN; I-structures in ID; events in PCF; streams in SISAL; and are likely to be helpful in implementing the user-specified synchronization constraints in Jade. This disclosure models computations that use synchronization variables as directed acyclic graphs (DAGs) in which each node is a unit time action and each edge represents either a control or data dependence between actions. The work of a computation is then measured as the number of nodes in the DAG and the depth as the longest path.

The method offers a schedule which, given a parallel program with synchronization variables such that the computation has w work, σ synchronizations, d depth and $s_1$ sequential space, executes the computation in $s_1+O(pd$ log (pd)) space and $O(w/p+\sigma$ log (pd)/p+d log (pd)) time on a p-processor CRCW PRAM with a fetch-and-add primitive. This includes all time and space costs for both the computation and the scheduler. This method is work-efficient for computations in which there are at least $\Omega(log(pd))$ units of work per synchronization (on average). In addition, the particulars here show that if the DAG is planar, or close to it, then the method executes the computation in $s_1+O(pd$ log p) space and $O(w/p+d$ log p) time, independent of the number of synchronizations. Planar DAGs a general class of DAGs.

This disclosure offers an efficient technique for maintaining the threads prioritized by their sequential execution order in the presence of synchronization variables. To maintain the priorities the particulars here introduce a black-white priority-queue data structure, in which each element (thread) is colored either black (ready) or white (suspended), and describe an efficient implementation of the data structure based on 2–3 trees. The scheduler is asynchronous (its execution overlaps asynchronously with the computation) and non-preemptive (threads execute uninterrupted until they suspend, fork, allocate memory or terminate).

For planar DAGs, the particulars here prove that a writer to a synchronization variable will only wake up a reader of the variable that has the same priority as itself, relative to the set of ready threads. This enables a more efficient implementation for planar DAGs. Planar DAGs appear, for example, in producer-consumer computations in which one thread produces a set of values which another thread consumes.

The particulars here use a set of threads, each comprised of a sequence of instructions. Threads can fork new threads and can synchronize through the use of write-once synchronization variables (henceforth just called synchronization variables). All threads share a single address space. The particulars here assume each thread executes a standard RAM instruction set augmented with the following instructions. The Fork instruction creates a new thread, and the current thread continues. The Allocate(n) instructions allocates n consecutive memory locations and returns a pointer to the start of the block. The SV-allocate instruction allocates a synchronization variable and returns a pointer to it. The Free instruction frees the space allocated by one of the allocate instructions (given the pointer to it). The standard Read and Write instructions can be used to read from and write to a synchronization variable as well as regular locations. Each synchronization variable, however, can only be written to once. A thread that performs a Read on an unwritten synchronization variable suspends itself; it is awakened when another thread performs a Write on that variable. The particulars here assume there is an End instruction to end execution of a thread.

In this model a future can be implemented by allocating a synchronization variable, forking a thread to evaluate the future value, and having the forked thread write its result to the synchronization variable. I-structures in ID can similarly be implemented with an array of pointers to synchronization variables and a fork for evaluating each value. Streams in SISAL can be implemented by associating a synchronization variable with each element, (or block of elements) of the stream.

The particulars here associate a directed acyclic graph (DAG) called a "computation graph" with every Computation in the model. The computation graphs are generated dynamically as the computation proceeds and can be thought of as a trace of the computation. Each node in the computation graph represents the execution of a single instruction, called an "action" (the particulars here assume that every action requires a single time step to be executed,) and the edges represent dependencies among the actions. There are three rinds of dependence edges in a computation graph: thread edges, fork edges and data edges. A thread is modeled as a sequence of its actions connected by "thread edges". When an action $a_1$ within a thread $\tau_1$ Forks a new thread $\tau_2$, a "fork edge" is placed from $a_1$ to the first action in $\tau_2$. When an action $a_1$ reads from a synchronization variable, a "data edge" is placed from the action $a_2$ that writes to that variable to $a_1$. The time costs of a computation are then measured in terms of the number of nodes in the computation graph, called the "work", the sum of the number of fork and data edges, called the number of "synchronizations", and the longest path length in the graph, called the "depth".

The particulars here state that a thread is "live" from when it is created by a fork until when it executes its end instruction, and a live thread is "suspended" if it is waiting on a synchronization variable. The particulars here also assume that computations are deterministic, that is, the structure of the computation graph is independent of the implementation.

To define the notion of serial space $s_1$ the particulars here need to define it relative to a particular serial schedule. The particulars here define this schedule by introducing a "serial priority order" on the live threads—a total order where $\tau_a > \tau_b$ means that $\tau_a$ has a higher priority than $\tau_b$. To derive this ordering the particulars here say that whenever a thread $\tau_1$ forks a thread $\tau_2$, the forked thread will have a higher priority than the forking thread ($\tau_2 > \tau_1$) but the same priority relative to all other live threads. The serial schedule the particulars here consider is the schedule based on always executing the next action of the highest-priority non-suspended thread. This order will execute a depth-first topological sort of the computation graph. The particulars here call such a serial schedule a "depth first 1-traversal" or "1DF-schedule". Serial implementations of the languages the particulars here are concerned with, such as PCF, ID, and languages with futures, execute such a schedule. For example, with futures, the 1DF-schedule corresponds to always fully evaluating the future thread before returning to the body. The particulars here refer to this depth-first order as the serial execution order.

Let $(a_1, a_2, \ldots, a_T)$ be the actions of a T node computation graph, in the order in which they are executed in a 1DF-schedule. To define the serial space $s_1$, the particulars here associate a weight w(a) with each action (node) a of the computation graph. For every action $a_i$ that corresponds to a SV-allocate the particulars here set $w(a_i)=1$ on the nose representing $a_i$; for every action $a_i$ that corresponds to an allocate(n) instruction the particulars here set $w(a_i)=n$; for every Free the particulars here place the negative of the amount of space that is deallocated by the Free; and for every other action the particulars here set the weight to zero.

Then the serial space requirement $s_1$ for an input of size N is defined as $s_1 = N + \max_{i=1, \ldots, T} (\Sigma^i_{j=1} w(a_j))$.

The following involve task graphs. Schedules of computation graphs represent executions in which the unit of scheduling is a single action. Therefore, an arrangement that generates such schedules may map consecutive actions of a thread onto different processors. This can result in high scheduling overheads and poor locality. To overcome these problems, the particulars here increase the granularity of the scheduled unit by grouping sequences of actions of a thread into larger "tasks"; each task is executed non-preemptively on one processor. The particulars here call the DAG of tasks a "task graph". Task graphs are created dynamically by the implementation described herein; one need not be aware of how the actions are grouped into tasks.

A "task graph" $G_T=(V,E)$ is a DAG with weights on the nodes and edges. Each node of $G_T$ is a "task", and represents a series of consecutive actions that can be executed without stopping. Each task $v \in V$ is labeled with a nonnegative integer weight t(v), which is the "duration" of task v (the time required to execute v, or the number of actions represented by v). For every edge $(u,v) \in E$, the particulars here call u the "parent" of v, and v the "child" of u. Each edge $(u,v) \in E$ has a weight l(u,v), which represents the minimum latency between the completion of task u and the start of task v. (The particulars here consider latencies due to the scheduling process.)

Once a task v is scheduled on a processor, it executes to completion in t(v) timesteps. The "work" w of a task graph $G_T$ is defined as $w = \Sigma_{v \in V} t(v)$. The "length" of a path in $G_T$ is the sum of the durations of the tasks along the path. Similarly, the "latency-weighted length" is the sum of the durations of the tasks plus the sum of the latencies on the edges along the path. The "depth" d of $G_T$ is the maximum over the lengths of all the paths in $G_T$, and the "latency-weighted depth" $d_l$ is the maximum over the latency-weighted lengths of all the paths in $G_T$.

As with computation graphs, the parallel execution of a computation on p processors can be represented by a "p-schedule" $S_p$ of its task graph. A p-schedule of a task graph $G_T=(V, E)$ is a sequence $(V_1, V_2, \ldots, V_T)$ which satisfies the following conditions:

1. $V = \cup_{i=\{1, \ldots, T\}} V_i$
2. The particulars here state v is "scheduled" in timestep i if $v \notin V_{i-1}$ and $v \in V_i$. If v is scheduled at timestep i, then $v \in V_j \leftrightarrow i \leq j < i+t(v)$.
3. $\forall i \in 1, \ldots, T, |V_i| \leq p$.
4. A task v is "completed" in timestep i if $v \in V_i$ and $v \notin V_{i+1}$. $\forall (u,v) \in E$, if u is completed in timestep i, and v is scheduled in timestep j, then $j > i + l(u,v)$.

A task v is "ready" when all its parent tasks have been completed and the latencies on all edges into v have been satisfied, but v is yet to be scheduled. The particulars here say that a p-schedule is "greedy" if $\forall i \in 1, \ldots, T, |V_i| \leq p$ implies all ready tasks are scheduled on that step. The proof of the following theorem can be found in.

Theorem 1. Given a task graph $G_T$ with w work and latency-weighted depth $d_l$, any greedy p-schedule of $G_T$ will require at most $w/p + d_l$ timesteps.

This is within a factor of two of the trivial lower bound of $\max(w/p, d_l)$.

The schedule must decide which of the ready tasks to schedule in each step of a schedule. If tasks are assigned priorities, and at every step, the tasks scheduled are the ready tasks with the highest priorities, the particulars here call the resulting schedule a "prioritized schedule". Let $S_1$ be any 1-schedule for a task graph with n tasks, and let $v_1, v_2, \ldots, v_n$ be the tasks in the order they appear in $S_1$. The particulars here say a prioritized p-schedule is "based" on $S_1$ if the relative priorities of tasks are based on their serial execution order: $\forall i,j \in \{i, \ldots, n\}, i<j \rightarrow \text{priority}(v_i) > \text{priority}(v_j)$.

The following deals with modeling space with task graphs. As with computation graphs, the particulars here associate weights with each task to model space allocations in a task graph. However, since each task may contain multiple allocations and deallocations, the particulars here introduce two integer weights for each task v in a task graph $G_T$: the "net memory allocation", n(v), and the "memory requirement", h(v). The weight n(v) is the difference between the total memory allocated and the total memory deallocated in v, and may be negative if the ideal locations exceed the allocations. The weight h(v) is the non-negative high-water mark of memory allocation in v, that is, the maximum memory allocated throughout the execution of task v. The task v can be executed on a processor given a pool of at least h(v) units of memory. If $C_i$ is the set of tasks; that have been completed at or before timestep i of S, that is, $C_i = \{v \in V_j \mid (i \leq i) \text{ and } v \notin V_{i+1}\}$ then the space requirement of S for an input of size N is defined as:

$$\text{space}(S) \leq N + \max_{i=1, \ldots, T} (\Sigma_{v \in Ci} n(v) + \Sigma_{v \in Vi-Ci} h(v))$$

Note that this is an upper bound on the space required by the actual execution, since there may be tasks v executing during a timestep that are not presently at their respective high-water marks h(v) of memory allocation. However, if S is a serial schedule, then the above expression for space(S) is an exact value for the space requirement of the execution it represents.

The following first describes how multi threaded computations are broken into task graphs. Next, the particulars here present an online and asynchronous scheduling algorithm that generates such task graphs and space-efficient schedules for them, and finally describe an efficient implementation of the scheduler. For now the particulars here assume that every action in a parallel computation with synchronization variables allocates at most a constant K (K≧1) units of space. The particulars here will first prove the space and time bounds of the generated schedule for such computations, and then show how to relax this assumption without affecting our space bounds.

Let G be the computation graph representing the computation and $G_T$ be the task graph representing the same computation. As with G, the task graph $G_T$ is created dynamically as the computation proceeds and contains data, fork, and thread edges. A thread is broken into a new task when it performs one of the following actions: (1) a Read on a synchronization variable when the variable is not ready (i.e., there has bee: no previous Write to it), (2) a Write on a synchronization variable with waiting threads (i.e., there has been at least one previous Read on the variable), (3) a Fork, and (4) an allocation that causes the memory requirement of the current task to exceed some threshold M. These interruptions in a thread are denoted "breakpoints". A fork edge between two actions in G becomes a fork edge between the corresponding tasks in $G_T$. $G_T$ has a data edge from a task, u, with a Write to a synchronization variable to every Cask, v, with a corresponding Read such that the Read takes place before the Write. The latencies on the edges of $G_T$ are determined by the time overhead incurred by the scheduling for maintaining ready tasks in the system.

The following deals with a sequence Async-Q. The job of the scheduler is to efficiently schedule the tasks generated as described above onto the processors. The method is online in the sense that it has to run while the computation is proceeding since neither the task graph nor the serial schedule are known. The method here presented uses a set of "worker" processors to run the tasks and a separate set of processors to execute the "scheduler". In the conclusion the particulars here mention how the processors might be shared. The worker processors run asynchronously with each other and with the scheduler. They only synchronize with the scheduler through two FIFO queues, called "$Q_{in}$" and "$Q_{out}$", and only when reaching a breakpoint. The processors executing the scheduler run synchronously with each other and are responsible for maintaining the set of all live threads L prioritized by their serial execution order, and for communicating with the workers through the FIFO queues. During a computation each live thread can either be "active" (currently in $Q_{in}$, $Q_{out}$ or being executed by a worker processor), "ready" if it is ready to execute but not active, or "suspended" if it is waiting on a synchronization variable. Let $R \subseteq L$, be the set of ready threads in L.

The following involves Async-Q:
Begin worker
   While (there exist threads in the system)
      $\tau :=$ remove-thread($Q_{out}$);
      execute $\tau$ until it reaches a breakpoint or terminates;
      insert-thread($\tau$, $Q_{in}$);
End Worker
Begin Scheduler
   While (there exist threads in the system)
      T:=remove-all-threads($Q_{in}$);
      For each thread $\tau$ in T
         If T has written to a synchronization variable $\zeta$, mark all threads suspended on $\zeta$ as ready in L;
         Else if $\tau$ has terminated, delete $\tau$ from L;
         Else if $\tau$ has forked, add the new thread to L;
         Else if $\tau$ has suspended on a synchronization variable, mark as suspended in L;
         Else retain $\tau$ as ready in L;
      mark min($|R|$, $q_{max}-|Q_{out}|$) ready threads with highest priorities in L as active and insert them into $Q_{out}$;
End scheduler The worker and scheduler computations execute asynchronously in parallel. $Q_{max}$ is the maximum size of $Q_{out}$, and $|Q_{out}|$ is the number of tasks in $Q_{out}$. The function remove-thread ($Q_{out}$) busy-waits until a thread becomes available and is removed from $Q_{out}$.

It is important to realize that the scheduler is executed by the set of scheduler processors while the worker is executed by each individual worker processor. The particulars here call each iteration of the scheduler loop a "scheduling iteration". In the last timestep of each scheduling iteration, the scheduler inserts tasks into $Q_{out}$, which are available to the workers at the next timestep. Initially L contains only the root thread, which is in the ready state.

To implement the scheduling on p processors the particulars here assign a constant fraction e p of the processors ($0<\alpha<1$) to the scheduler computation, and the remaining $(1-\alpha)$p processors as workers.

The scheduler facilitates maintaining the threads in L prioritized by their serial execution order, so that it can efficiently pick the ready threads with the highest priorities in every scheduling iteration. The particulars here present an implementation of L as a "black-white priority queue" which allows efficient access. In the queue each element is either black (representing ready threads) or white (representing active or suspended threads). Since the absolute serial execution order of the threads is not known for online computations, the queue maintains threads according to their relative ordering. The operations supported by the priority queue and their corresponding functions in the scheduler are:
  (i) In queue operation: Recolor white element to black. Function in scheduler: Awaken suspended thread or convert thread from active to ready
  (ii) In queue operation: Split element into two adjacent elements. Function in scheduler: Fork new threads
  (iii) In queue operation: Delete element. Function in scheduler: Remove terminated thread
  (iv) In queue operation: Select m black elements with highest priority and recolor to white. Function in scheduler: Move highest-priority ready threads to $Q_{out}$ The particulars here implement the black-white priority queue using a 2–3 tree in which the elements (threads) are kept at the leaves and are ordered by their relative priorities from left to right (the leftmost leaf has the highest priority) (Other balanced tree implementations that support fast parallel inserts, deletes and lookups might be used instead of 2–3 trees). As with standard 2–3 trees, all leaves are kept at the same level and all internal nodes have 2 or 3 children. Instead of keeping keys at each internal node, however, the particulars here keep a court. The count represents the number of black elements in the subtree rooted at the node. Keys are not used since the particulars here will not need to search the tree—in fact, since the absolute serial ordering is not known, there are no key values to use. For this data structure, the particulars here can prove the following bound on the time required to execute operations on its elements.

Lemma 1. Using a black-white priority queue of size n, each of the four operations above on m elements can be implemented to run in $O((m/p) \log n)$ time in an p-processor EREW PRAM.

Proof. For all the operations, the particulars here assume direct pointers to the m elements in the 2–3 tree. Consider each of the four operations. (1) For recoloring m white elements to black the details here start with the m elements at the leaves and work our way up the tree incrementing the counters appropriately. This is executed in parallel level by level. When paths from two (or three) recolored elements to the root meet at an internal node, the two (three) increments are combined, and only one proceeds to the next level. (2) For splitting m elements the details here can use a procedure similar to Paul, Vishkin and Wagener's procedure for inserting into 2–3 trees. (See W. Paul, U. Vishkin, H. Wagener, Parallel dictionaries on 2–3 trees, In Lecture Notes in Computer Science 143: Proceedings Colloquium on Automata, Languages and Programming, pages 597–609, July 1983,) Since each leaf can only split into two leaves, the splitting may convert a node just above the leaf level into a 4, 5 or 6 node which then needs to be split. This in turn may split nodes at the next level, and the splitting can go up the tree level by level to the root. The counts are updated along the way as before. (3) For deleting elements the details here can again use a procedure similar to the one used by Paul, Vishkin and Wagener. Since a set of contiguous elements may need to be deleted, the pipelined version of their algorithm is used. (4) For selecting the m highest-priority black elements the details here can start at the root and proceed downwards, using the counts to locate the leftmost m elements, and searching the required subtrees in parallel. Operations (1) and (2) can be implemented in $O((m/p) \log n)$ time on an EREW PRAM by simply having each of the m elements walk its way up the tree in parallel. Operation (3) will run within the same bounds since the pipeline will only create a delay of $O((m/p) \log n)$. Operation (4) can be implemented on a EREW PRAM by starting with one job at the root and then forking one, two or three jobs at each node depending on which nodes need to be searched to find the desired black elements. Since the details here know how many black elements are within each subtree the details here can assign a proportional number of processors to search that subtree and only one needs to look at the root. Since the depth of the tree is bound by log n and the total number of forked jobs at completion is bound by m the time is bound by $O((m/p) \log n)$.

The other operation the scheduler needs to perform is to handle the queues of threads waiting on synchronization variables. The details here use an array for each queue, which the details here will call a "synchronization queue".

Aiming for an efficient implementation of the scheduler, the details here set $Q_{max}$ to be p and the maximum task space M to be log (pd). The details here can show that no more than $P=(2+1-\alpha)p<3$ p threads can be active at any time, and all the P active threads can end up in $Q_{in}$ before the start of a scheduling iteration. Therefore, a step of the scheduler will need to split, delete, and select at most 3 p elements. However it could recolor a larger number since awakening threads can potentially recolor all the white nodes to black.

Lemma 2. The sum of the time taken by any m scheduling iterations is bound by $O((\sigma/p+m) \log |L|)$ time on a $\alpha p$ processor CRCW PRAM with fetch-and-add.

The following deals with space and time bounds. The details here first define a class of space-efficient schedules called Q-prioritized schedules, by presenting a high-level description of scheduling algorithms that generate them. Such schedules are based on serial schedules but are not completely prioritized; this deviation from priorities allows the schedules to be generated in a simple and efficient manner. The details here then prove the space and time bounds for schedules generated by algorithm Async-Q by showing that they are Q-prioritized schedules.

Q-prioritized schedules are the class of schedules that are generated by any scheduling algorithm that conforms to the following rules.

1. The scheduling algorithm maintains a FIFO work queue that contains a subset of the ready tasks. Let $Q_{max}$ be the maximum size of the work queue, and let $Q_t$ be the tasks in it at timestep t. Idle processors take tasks from the head of the work queue and execute them.

2. Let $R_t$ be the set of all ready tasks at timestep t of the execution, and let $R_t'=R_t-Q_t$ be the subset of $R_t$ not in the work queue. Let $T_t$ be the set of tasks moved from $R_t'$ to the work queue at timestep t. Then, $|T_t| \leq \min(Q_{max}-|Q_t|, |R_t'|)$, and $T_t$ is the subset of $R_t'$ with the highest priorities. No tasks are moved back from $Q_t$ to $R_t'$.

As with prioritized schedules, priorities are based on the serial execution order of the tasks. Tasks inserted into the work queue at timestep t are available to the processors at timestep t+1. If $|T_t|>0$ the details here call t a "queuing step".

The details here call u the "last parent" of v in a schedule, if it is the last of v's parents to be completed in the schedule. Due to latencies on edges into v, it may not become ready until several timesteps after u is completed. For any task $v \in V$, let q(v) be the number of queuing steps that take place after the last parent of v has been completed and before task v is ready. The details here define the "queuing delay $q_d$" of a Q-prioritized schedule as $q_d = \max_{v \in V} q(v)$. This metric reflects the asynchronous overlap between the execution of the scheduling algorithm that inserts tasks into the work queue, and the parallel computation, and depends on how often the scheduling algorithm executes queuing steps.

Let the "maximum task space" M of a task graph $G_T=(V,E)$ be the maximum over the memory requirements of all tasks in $G_T$; that is, $M=\max_{v \in V} h(v)$.

Theorem 2. Let $G_T$ be a task graph with depth d and maximum task space M. Let $S_p$ be any Q-prioritized p-schedule for $G_1$ based on any 1-schedule $S_1$ of $G_T$. If $S_p$ is generated using a work queue of size $Q_{max}$, and $q_d$ is the queuing delay of $S_p$, then $\text{space}(S_p) \leq \text{space}(S_1)+(q_d+1)Q_{max}+p-1)$ M d.

The details here can now bound the space requirements of the schedules generated by algorithm Async-Q, by showing that they are Q-prioritized schedules.

Lemma 3. For a parallel computation with w work, s synchronizations, and d depth, in which every action allocates at most a constant K units of space, the Async-Q algorithm on p processors, with $Q_{max}=p$, creates a task graph $G_T$ with work O(w) at most s synchronizations, depth O(d) latency-weighted depth $d_l=O((s/p+d) \log l_m)$, and maximum task space log (pd), where $l_m$ is the maximum number of live threads in L. For a constant e, 0<e<1, the algorithm generates a Q-prioritized $((1-\alpha)p)$-schedule for $G_T$ based on the serial depth-first schedule, with a queuing delay of at most 1.

Proof. As described above, algorithm Async-Q splits each thread into a series of tasks at runtime. Since each thread is executed non-preemptively as long as it does not synchronize, terminate, fork, o r allocate more than a maximum of M=log (pd) units of memory, each resulting task v has a memory requirement $h(v) \leq \log(pd)$. For each task v in $G_T$, a processor performs two unit-time accesses to the queues $Q_{out}$ and $Q_{in}$. Thus the total work performed by the processor for task v is $t(v)+2$, where $t(v) \geq 1$ and $\sum_v t(v)=w$. Therefore the total work of $G_T$ is O(w), and similarly, the depth is O(d). $G_T$ has at most s synchronizations, since besides forks, only the pairs of Reads and Writes that result in the suspension of the reading thread contribute to synchronizations in $G_T$.

Next, the details here show that the algorithm Async-Q generates Q-prioritized schedules with a queuing delay $q_d \leq 1$. If r is the number of reedy threads in R, the scheduler puts $\min(r, p-|Q_{out}|)$ tasks into $Q_{out}$. Moreover, these tasks are the tasks with the highest priorities in R, where the priorities are based on the serial, depth-first execution order. Therefore, using $Q_{out}$ as the FIFO work queue[] of maximum size $Q_{max}=p$, and the ordered set R to represent the set of ready tasks that are not in the work queue, Async-Q generates a Q-prioritized schedule. With $(1-\alpha)p$ processors executing the worker computation, the resulting schedule is a Q-prioritized $((1-\alpha)p)$-schedule. The last timestep of every scheduling iteration is a queuing step, since all the tasks moved to $Q_{out}$ at the end of that iteration are available after this timestep. Consider any task v in $G_T$. Let t be the timestep in which the last parent u of v is completed. u is placed in $Q_{in}$ at timestep t+1 (assuming the insertion uses a unit-time fetch-and-add). In the worst case, a scheduling iteration may end in timestep t+1, making t+1 a queuing step. However, the next scheduling iteration must find u in $Q_{in}$. Since u was the last parent of v, v becomes ready during this scheduling iteration (the details here consider it to become ready just before the last timestep of the iteration). Therefore, the next queuing step, which is the last timestep of this scheduling iteration, takes place after v becomes ready. Thus, for any v, at most one queuing step can take place after its last parent is completed and before v becomes ready, that is, $q_d \leq 1$.

Finally, the details here bound the latency-weighted depth $d_l$ of $G_T$. Consider any path in $G_T$. Let l be its length. For any edge (u,v) along the path, if u is the last parent of v, then v becomes ready at the end of at most two scheduling iterations after u is computed. Therefore the latency l(u,v), is at most the durations of two scheduling iterations. (If u is not the last parent of v, the details here can use l(u,v)=0 since it does not affect the schedule or its analysis.) Since any path in $G_T$ has at most (d−1) edges, the latency-weighted depth of the path is at most the sum of the times required for 2(d−1) scheduling iterations plus the depth d, which is, using Lemma 2, $O((s/p+d) \log l_m)$.

Next, the details here bound the size of L.

Lemma 4. The maximum number of live threads in L is $l_m=O((Q_{max}+p)d)$, which is O(pd) when $Q_{max}=p$.

Proof. The maximum number of live threads during the execution of a Q-prioritized p-schedule $S_p$ (with queuing delay $q_d$) based on $S_1$ exceed s the maximum number of live threads during the execution of $S_1$ by at most $((q_d+1)Q_{max}+p-1)$ times $O(d)=O((Q_{max}+p)$ d) (using Lemma 3 and Lemma 2 in "Lemma 4.1 in G. J. Narlikar and G. E. Blelloch, Space-efficient implementation of nested parallelism, In Proceedings Symposium on Principles and Practice of Parallel Programming, pages 25–36, June 1997"), plus the number of threads in $Q_{out}$ (which may have been created but have not started execution yet). Since $S_1$ is a depth-first schedule, at most d threads can exist during its execution. Further, $Q_{out}$ can have at most $Q_{max}$ threads. Therefore, L, which contains all the live threads, can have at most $O((Q_{max}+p)d)$ threads. QED.

The details here can now bound the number of timesteps required to execute the resulting schedules.

Lemma 5. Let $G_T$ be the task graph created by algorithm Async-Q for a parallel computation with w work, s synchronizations, and d depth, and let $S_p$ be the $(1-\alpha)p$-schedule generated for $G_T$, where e is a constant (0<e<1). If $Q_{max}=p$, then the length of $S_p$ is $|S_p|=O((w+s \log(pd))/p+d \log(pd))$.

Proof. The details here will show that $S_p$ is a greedy schedule, with $O((w+s \log(pd))/p)$ additional timesteps in which the workers may be idle. Consider any scheduling iteration. Let $t_i$ be the timestep at which the i 'th scheduling iteration ends. After tasks are inserted into $Q_{out}$ by the i 'th scheduling iteration, there are two possibilities:

1. $|Q_{out}|<p$. This implies that all the ready tasks are in $Q_{out}$, and no new tasks become ready until the end of the next scheduling iteration. Therefore, at every timestep j such that $t_i<j \leq t$, if $m_j$ processors become idle and $r_j$ tasks are ready, $\min(m_j, r_j)$ tasks are scheduled.

2. $|Q_{out}|=p$. Since $(1-\alpha)p$ worker processors will require at least $1/(1-\alpha)$ timesteps to execute p tasks, none of the processors will be idle for the first $1/(1-\alpha)=O(1)$ steps after $t_i$. However, if scheduling iteration i+1, which is currently executing, has to awaken $n_{i+1}$ suspended threads, it may execute for $O((n_{i+1}/p+1) \log(pd))$ timesteps (using Lemmas 2 and 5). Therefore, some or all of the worker processors may remain idle for $O((n_{i+1}/p+1) \log(pd))$ timesteps before the next scheduling step; the details here call such steps "idling timesteps". The details here split the idling timesteps of each scheduling iteration into the first $I_1=\theta(\log(pd))$ idling timesteps, and the remaining $I_2$ idling timesteps. A task with a fork or data edge out of it may execute for less than $I_1$ timesteps; the details here call such tasks "synchronization tasks". However, all other tasks, called "thread tasks", must execute for at least $I_1$ timesteps, since they execute until their space requirement reaches log (pd), and every action may allocate at most a constant amount of memory. Therefore, if out of the p tasks on $Q_{out}$, $p_s$ are synchronization tasks, then during the first $I_1$ steps of the iteration, at most $p_s$ processors will be idle, while the rest are busy. This is equivalent to keeping these $p_s$ processors "busy" executing no-ops (dummy work) during the first $I_1$ idling timesteps. Since there are at most s synchronization tasks, this is equivalent to adding s log (pd) no-ops, increasing the work in $G_T$ to w'=O(w+s log (pd)), and increasing its latency-weighted depth $d_l$ by an additive factor of at most θ(log (pd)). There can be at most O(w'/p)=O(w+s log (pd))/p such steps in which all worker processors are "busy". Therefore, the $I_1$ idling timesteps in each scheduling iteration can add up to at moss O((w+s log (pd))/p). Further, since a total of O(s) suspended threads may be awakened, if scheduling iteration i+1 results in an additional $I_2$=O($n_{i+1}$ log (pd)/p) idling timesteps, they can add up to at most O(s log (pd)/p). Therefore, a total of O(i(w+s log (pd))/p) idling timesteps can result due the scheduler.

All timesteps besides the idling timesteps caused by the scheduler obey the conditions required to mare it a greedy schedule, and therefore add up to O(w')/p+$d_l$=O((w+s log (pd))/p+d log (pd)) (using Theorem 1 and Lemma 4). Along with the idling timesteps, the schedule requires a total of O((w+s log (pd))/p+d log (pd)) timesteps. QED Note that since $Q_{max}$=p, the maximum number of threads in both $Q_{in}$ and $Q_{out}$ is O(p), and each thread can be represented using constant space. (This is the memory required to store its state such as registers, not including the stack and heap data.) Therefore, using Theorem 1 and Lemmas 4, 5, and 6 the details here obtain the following theorem which includes scheduler overheads.

Theorem 3. For a parallel computation with w work, s synchronizations, d depth, and $s_1$ sequential space, in which at most a constant amount of memory is allocated in each action, the Async-Q algorithm (with $Q_{max}$=p) generates a schedule for the parallel computation and executes it on p processors in O((w+s log (pd))/p+d log (pd)) time steps, requiring a total of $s_1$+O(dp log (pd)) units of memory.

For handling arbitrarily big allocations, actions that allocate more that a constant K units of memory are handled in the following manner, similar to the technique as disclosed in U.S. application Ser. No. 08/502,625, filed Jul. 14, 1995. The key is to delay the big allocations, so that if tasks with higher priorities become ready, they will be executed instead. Consider an action in a thread that allocates m units of space (m>K), in a parallel computation with work w and depth d. The details here transform the computation by inserting a fork of m/log(pd) parallel threads before the memory allocation. These new child threads do not allocate any space, but each of them performs a dummy task of log(pd) units of work (no-ops). By the time the last of these new threads gets executed, and the execution of the original parent thread is resumed, the details here have scheduled m/log(pd) tasks. These m/log(pd) tasks are allowed to allocate a total of m space, since the details here set the maximum task space M=log(pd). However, since they do not actually allocate any space, the original parent thread may now proceed with the allocation of m space without exceeding our space bound.

This transformation requires the scheduler to implement a fork that creates an arbitrary number of child threads. To prevent L from growing too large, the child threads are created lazily by the scheduler and a synchronization counter is required to synchronize them. (See G. J. Narlikar and G. E. Blelloch, Space efficient implementation of nested parallelism, In Proceedings Symposium on Principles and Practice of Parallel Programming, pages 25–36, June 1997). Let $S_K$ be the "excess allocation" in the parallel computation, defined as the sum of all memory allocations greater than K units. Then the work in the transformed task graph is O(w+$S_K$), and the number of synchronizations is s+2 $S_K$/log (pd). As a result, the above time bound becomes O((w+$S_K$+s log (pd))/p+d log (pd)), while the space bound remains unchanged. When $S_K$=O(w), the time bound also remains unchanged.

Theorem 3 can now be generalized to allow arbitrarily big allocations of space. Note that the space and time bounds include the overheads of the scheduler.

Theorem 4. Let $S_1$ be the serial depth-first schedule for a parallel computation with w work; s synchronizations, and d depth. For any constant K≧1, let $S_K$ be the excess allocation in, the parallel computation. The Async-Q algorithm, with $Q_{max}$=p log p, generates a schedule for the parallel computation and executes it on p processors in O((w+$S_K$+s log (pd))/p+d log (pd)) time steps, requiring a total of space($S_1$)+O(dp log (pd)) units of memory.

Remark. If the depth d of the parallel computation is not known at runtime, suspending the current thread just before the memory requirement exceeds log (pd) units is not possible. Instead, if L contains l threads when a thread is put into $Q_{out}$, setting its maximum memory to O(log (1+p)) units results in the same space and time bounds as above.

For optimal scheduling of planar computation graphs, the details here provide a work- and space-efficient scheduling algorithm, denoted Planar Asynch-Q, for planar computation DAGs. The main result used My the algorithm is a theorem showing that, for planar DAGs, the children of any node v have the same relative priority order as v; this greatly simplifies the task of maintaining the ready nodes in priority order at each scheduling iteration. The details here furnish an algorithm that is a hybrid of Planar Asynch-Q and Asynch-Q, suitable for general DAGs.

For maintaining priority order for planar graphs, a computation graph G is used. For a computation graph G, the following general scheduling algorithm maintains the set, R*, of its ready nodes (actions) in priority order according to the 1DF-schedule $S_1$.

In algorithm Planar, R* is an ordered set of ready nodes initialized to the root of G. Repeat at every timestep until R* is empty:

1. Schedule any subset of the nodes from R*.
2. Replace each newly scheduled node with its zero or more ready children, in priority order, in place in the ordered set R*. If a ready child has more than one newly scheduled parent, consider it to be a child of its lowest priority parent in R*.

Note that Algorithm Planar does not require the subset scheduled in step 1 to be the highest-priority nodes in R*. Moreover, it does not maintain in R* place-holders for suspended nodes in order to remember their priorities. Instead, each newly-reactivated suspended node will be inserted into R* (in step 2) in the place where the node activating it was, since it is a child of its activating node. The details here show below that for planar computation graphs, priority order is maintained.

The details here begin by reviewing planar graph terminology. A graph G is "planar" if it can be drawn in the plane so that its edges intersect only at their ends. Such a drawing is called a "planar embedding" of G. A graph G=(V,E) with distinguished nodes s and t is (s,t)-planar if G'=(V,E ∪ {(t,s)}) has a planar embedding. To define a 1-schedule for G it is necessary to specify priorities on the outgoing edges of the nodes. Given a planar embedding of a DAG G, the details here will assume that the outgoing edges of each node are prioritized according to a counterclockwise order, as follows:

Lemma 6. Let G be a DAG with a single root node, s, and a single leaf node, t, such that G is (s,t)-planar, and consider a planar embedding of G'=(V,E ∪{(t,s)}). For each node v in G', v≠t, let $e_1, e_2, \ldots, e_k$, k≧2, be the edges counterclockwise around v such that $e_1$ is an incoming edge and $e_k$ is an outgoing edge. Then for some 1≦j<k, $e_1, \ldots, e_j$ are incoming edges and $e_{j+1}, \ldots, e_k$ are outgoing edges.

Proof. Suppose there exists an outgoing edge $e_x$ and an incoming edge $e_y$ such that x<y. Consider any (directed) path $P_1$ from the root node s to nose v whose last edge is $e_1$, and any (directed) path $P_y$ from s to v whose last edge is $e_y$. Let u be the highest level node that is on both $P_1$ and $P_y$ but is not v. Let C be the union of the nodes and edges in $P_1$ from u to v inclusive, and in $P_y$ from u to v, inclusive. Then C partitions G into three sets: the nodes and edges inside C in the planar embedding, the nodes and edges outside C in the planar embedding, and the nodes and edges of C.

Note that one of $e_x$ or $e_k$ is inside C and the other is outside C. Since v is not t, t must be either inside or outside C. Suppose t is outside C, and consider any path P from v to t that begins with whichever edge $e_x$ or $e_k$ is inside C. P cannot contain a node in C other than v (since G is acyclic) and cannot cross C (since the details here have a planar embedding), so other than v, P contains only nodes and edges inside C, and hence cannot contain t, a contradiction. Likewise, if t is inside C, then a contradiction is obtained by considering any path from v to t that begins with whichever edge $e_x$ or $e_k$ is outside C.

Thus no such pair, $e_x$ and $e_y$, exist and the lemma is proved.

Let G be an (s,t)-planar DAG with a single root node s and a single leaf node t. The details here say that G has "counterclockwise edge priorities" if there is a planar embedding of G'=(V,E ∪{(t,s)}) such that for each node v ∈ V, the priority on the outgoing edges of v (used for $S_1$) is according to a counterclockwise order from any of the incoming edges of v in the embedding (i.e., the priority order for node v in the statement of Lemma 6 is $e_{j+1}, \ldots, e_k$). Thus the DAG is not only planar, but the edge priorities at each node (which can be determined online) correspond to a planar embedding. Such DAGs account for a large class of parallel languages including all nested-parallel languages, as well as other languages such as Cilk. If actions of a DAG are numbered in the order in which they appear in a 1DF-schedule, the details here call the resulting numbers the "1DF-numbers" of the actions.

Theorem 5. For any single root s, single leaf t, (s,t)-planar computation graph G with counterclockwise edge priorities, the online Algorithm Planer above maintains the set R*, of ready nodes in priority-order according to the 1DF-schedule $S_1$.

Proof. The details here first prove properties about the 1DF-numbering of G, and then use these properties to argue Algorithm Planar maintains the ready nodes in relative order of their 1DF-numbers.

Let G=(V,E), and consider the planar embedding of G'= (V,E ∪{(t,s)}) used to define the counterclockwise edge priorities. The details here define the "last parent tree" for the 1DF-schedule of G to be the set of all nodes in G and, for every node v other than s, the details here have an edge (u,v) where u is the parent of v with highest 1DF-number. Note that a 1DF-schedule on the last parent tree would schedule nodes in the same order as the 1DF-schedule on G.

Consider any node u that is neither s nor t. Define the "rightmost" path $P_r(u)$ from s to u to be the path from s to u in the last parent tree. Define the "leftmost" path $P_l(u)$ from u to t to be the path taken by always following the highest-priority child in G. Define the "splitting path" $P_s(u)$ to be the path obtained by appending $P_r(u)$ with $P_l(u)$.

In the embedding, the nodes and edges of the cycle $P_s(u)$ ∪{(t,s)} partition the nodes not in $P_s(u)$ into two regions—inside the cycle and outside the cycle—with no edges between nodes in different regions. Consider the counterclockwise sweep that determines edge priorities, starting at any node in the cycle. If the cycle is itself directed counterclockwise (clockwise), this sweep will give priority first to any edges in the outside (inside, respectively) region, then to edges in the cycle, and then to any edges in the inside (outside, respectively) region. A node w not in $P_s(u)$ is "left" of $P_s(u)$ if it is in the region given first priority; otherwise it is "right" of $P_s(u)$.

The details here assert that all nodes left (right) of $P_s(u)$ have 1DF-numbers less than (greater than, respectively) u. The proof is by induction on the level in G of the node. The base case, l=1, is trivial since s is the only node at level 1. Assume the assertion is true for all nodes at levels less than l, for l≧2. The details here will show the assertion holds for all nodes at level l.

Consider a node w at level l, and let x be its parent in the last parent tree; x is at a level less than l. Suppose w is left of $P_s(u)$. Since there are no edges between left and right nodes, x is either in $P_s(u)$ or left of $P_s(u)$. If x is in $P_s(u)$ then (x,w) has higher priority than the edge in $P_s(u)$ out of x. Thus by the definition of $P_l(u)$, x cannot be in $P_l(u)$. If x is in $P_r(u)$, then a 1DF-schedule on the last parent tree would schedule x and w before scheduling any more nodes in $P_s(u)$ (including u). If x is left of $P_s(u)$, then u is not a descendant x in the last parent tree (since otherwise x would be in $P_r(u)$). By the inductive assumption, a 1DF-schedule on the last parent tree would schedule x before u, and hence schedule any descendant of x in the last parent tree (including w) before u. Thus w has a 1DF-number less than u.

Now suppose w is right of $P_s(u)$. Its parent x is either right of $P_s(u)$ or in $P_s(u)$. If x is right of $P_s(u)$, then by the inductive assumption, x and hence w has a 1DF-number greater than u. If w is a descendant of u, then w has a 1DF-number greater than u. So consider x not equal u in $P_r(u)$. A 1DF-schedule on the last parent tree will schedule the child, y, of x in $P_r(u)$ and its descendants in the tree (including u) before scheduling w, since (x,y) has higher priority than (x,w). Thus w has a 1DF-number greater than u.

The assertion follows by induction. Now consider a step of Algorithm Planar and assume that its ready nodes R* are ordered by their 1DF-numbering (lowest first). The details here want to show that a step of the algorithm will maintain the ordering. Consider two nodes u and v from R* such that u has a higher priority (i.e, a lower 1DF-number) than v. Assume that during this step there is involved scheduling u (and possibly v). Since both u and v are ready, u cannot be in the splitting path $P_s(v)$. Since u has a lower 1DF-number than v, it follows from the assertion above that u is left of $P_s(v)$. Since there are no edges between nodes left and right of a splitting path, the children of u are either in $P_s(v)$ or left of $P_s(v)$. If a child is in $P_s(v)$ then it is a descendant of v and the child would not become ready without v also being scheduled. But if v were scheduled, u would not be the lowest priority parent of the child, and hence the algorithm would not assign the child to u. If a child is to the left of $P_s(v)$, then by the assertion above, it will have a lower 1DF-number than v. When placed in the position of u, the child will maintain the 1DF-number ordering relative to v (and any children of v) in R*. Likewise, for any node w in R* with higher priority than u, w and the children of w (if w is scheduled) will have lower 1DF-numbers than u and its children.

Since Algorithm Planar schedules a subset of R* and puts ready children back in place it maintains R* ordered relative to the 1DF-numbering. QED Note that the previous theorem held for any planar computation graph, with arbitrary fan-in and fan-out, and did not use properties of computations with synchronization variables.

The following deals with left-to-right synchronization edges. The details here consider an important class of DAGs such that the write of any synchronization variable precedes any read of the variable when the computation is executed according to a serial depth-first schedule. In languages with futures, for example, this implies that in the serial schedule, the part of the computation that computes the futures value precedes the part of the computation that uses the futures value. The details here refer to such DAGs as having "left-to-right synchronization edges".

The following deals with implementing the scheduler for planar computation graphs. The details here next show how Algorithm Planar can be used as the basis for an asynchronous, non-preemptive scheduler that uses tasks as the unit of scheduling, for planar DAGs with left-to-right synchronization edges. The details here modify the scheduler for algorithm Async-Q as follows. Instead of maintaining the prioritized set of all live threads L, the scheduler maintains the prioritized set R*, which contains the ready and active threads. Suspended threads are queued up in the synchronization queue for their respective synchronization variable, but are not kept in R*. Since there are no suspended threads in R*, techniques developed previously for programs without synchronization variables can be used to obtain our desired bounds, specifically, an array implementation that uses lazy forking and deleting with suitable prefix-sums operations.

When a thread writes to a synchronization variable, it checks the synchronization queue for the variable, and awakens any thread in the queue. In an (s,t)-planar DAG with left-to-right synchronization edges, there can be at most one suspended reader awaiting the writer of a synchronization variable. (Any such reader must have at least two parents: the writer w and some node that is not a descendant of w or any other reader. A simple argument shows that for the DAG to be planar, there can be at most one such reader to the "right" of w.) Thus fetch-and-add is not needed for the synchronization queues, and in fact an EREW PRAM suffices to implement the scheduler processors. Following Algorithm Planar, the details here insert the suspended thread just after the writer threat in R*, thereby maintaining the priority order.

At each scheduling iteration, the scheduler processors append to $Q_{out}$ the min($|R|$, $Q_{max}-|Q_{out}|$) ready threads with highest priority in R*. The worker processors will select threads from the head of $Q_{out}$ using a fetch-and-add primitive. Denoting the modified Async-Q algorithm as "Planar Async-Q", the details here have the following theorem:

Theorem 6. Let $S_1$ be the 1DF-schedule for a parallel computation with synchronization variables that has w work, d depth, at most a constant amount of memory allocated in each action, and whose computation graph is (s,t)-planar with counterclockwise edge priorities and left-to-right synchronization edges. The Planar Async-Q algorithm, with $Q_{max}$=p log p, generates a schedule for the parallel computation and executes it on p processors in O(w/p+d log p) time steps, requiring a total of space($S_1$)+ O(dp log p) units of memory. The scheduler processors run on an EREW PRAM; the worker processors employ a constant-time fetch-and-add primitive.

The details here develop a hybrid of Async-Q and Planar Async-Q that works for any parallel program with synchronization variables, and runs within the time and space bounds for the planar algorithm if the computation graph is planar or near planar, and otherwise runs within the bounds for the general algorithm. The hybrid algorithm starts by running a slightly modified Planar Async-Q algorithm which maintains, for each node v in R*, a linked list of the suspended nodes priority ordered after v and before the next node in R*. By Lemma 6, the number of suspended nodes is O(pd log p), and the details here allocate list items from a block of memory of that size. As long as any node that writes a synchronization variable reactivates the first suspended node in its list, as will be the case for planar computation graphs with left-to-right synchronization edges and possibly others, the hybrid algorithm continues with this approach. When this is not She case, then the details here switch to the (general) Async-Q algorithm. The set L needed for algorithm Async-Q is simply the set of threads corresponding to nodes in R* and in the suspended nodes lists. From R* and the suspended nodes lists, the retails here link up one long list of all threads in t in priority order. Since all linked list items have been allocated from a contiguous block of memory of size O(dp log p), the details here can perform list ranking to number the entire list in order and then create a black-white priority queue as a balanced binary tree. The details here can then proceed with the Async-Q algorithm.

Here the details mention some issues concerning the practicality of the technique. First the details here note that although the implementation uses fetch-and-add, the only places where it is used are for the processors to access the work queues (in which case the details here can get away with a small constant number of variables), and to handle the queues of suspended jobs. Other work has shown that for certain types of code the number of reads to any synchronization variable can be limited to one, making the fetch-and-add unnecessary for handling the queues of suspended jobs.

If the parallel computation is very fine grained, the number of synchronizations s can be as large as the work w, resulting in a running time of O(log(pd) (w/p+d)), which is not work efficient. However, since synchronizations are expensive in any implementation, there has been considerable work in reducing the number of synchronizations using compile-time analysis.

The implementation described for the scheduling algorithm assumes that a constant fraction of the processors are assigned to the scheduler computation, eliminating them from the work-force of the computational tasks. An alternative approach is to have all processors serve as workers, and assign to the scheduler computation only processors that are idle, between putting their thread in $Q_{in}$, and taking their new threads from $Q_{out}$. A scheduling iteration is executed by a pool of up to p processors that ray join to the pool incrementally, in an asynchronous fashion. A worker processor that becomes idle puts its thread in $Q_{in}$, and then joins the pool of scheduler processors, until the scheduling iteration is over ($Q_{max}$ threads have been put in $Q_{out}$). Then it becomes a worker processor again, taking jobs from $Q_{out}$. A new scheduling iteration starts as soon as the first worker processor becomes idle. It remains to show that the implementation of the scheduling iteration is still within the same bounds of work and space as before. The details here observe that any implementation (of any algorithm) which assumes p processors, can be executed by an incremental pool of at most p processors within the same bounds (or better) of work and space, as follows. Consider the DAG which represents the p-processor implementation, let $S_p$ be a p-schedule of the DAG which corresponds to the implementation, and let $S_1$ be a 1-schedule of the DAG which is consistent with $S_p$; i.e., such that $S_p$ is based on $S_1$ (in general, there may be several possible choices for $S_1$). The processors in the pool will be scheduled according to the priorities determined by $S_1$.

The details here finally note that the various queues used in the scheduling algorithm can be implemented using asynchronous low-contention data structures such as counting networks and diffracting trees.

What is claimed is:

1. A method of parallel processing, comprising:
    selecting, in an assignment manager, a sequential schedule to determine priorities for processing;
    assigning, in the assignment manager, live tasks available for scheduling according to priorities on the basis of the sequential schedule;
    making, in the assignment manager, the highest priority live tasks that are available for scheduling available for processing by parallel processing elements;
    extracting, by said processing elements, available tasks for processing into each of said processing elements; and
    executing tasks from the extracted tasks in each of the processing elements;
    said sequential schedule and determining of priorities being independent of the execution of the extracted tasks in the processing elements;
    choosing, in the assignment manager, an operating criterion for execution of the extracted tasks in the processing elements; and
    said executing of tasks in each of said processing elements including executing extracted tasks until the criterion is reached and then feeding information concerning the execution to the assignment manager.

2. A method as in claim 1, wherein tasks are spawned during executing of tasks and the tasks are given priorities on the basis of the sequential scheduling.

3. A method as in claim 1, wherein said sequential ordering is a Depth-first (DF) schedule.

4. A method as in claim 1, further comprising placing information on completed tasks in the assignment manager and new live tasks generated by execution into a task in queue.

5. A method as in claim 4, further comprising fetching information on completed tasks and new live tasks from the task in queue and updating to remove records of completed tasks and include records of new live tasks.

6. A method as in claim 4, further comprising placing in the task queue notification that the parallel program has completed.

7. A method as in claim 1, wherein the assignment manager selects a depth first order as the sequential schedule used to determine priorities.

8. A method as in claim 1, wherein the assignment manager places the live tasks in a depth first order, and places records that mark these tasks as unblocked.

9. A method as in claim 1, wherein the assignment manager determines which tasks are available for scheduling and not blocked.

10. A method as in claim 1, wherein the assignment manager removes records of completed tasks and includes records of new live tasks, marks said tasks awaiting a flag as blocked awaiting a flag and otherwise marks said tasks as unblocked, and marks as unblocked any tasks awaiting any of the new flags.

11. A method as in claim 1, wherein the criterion is time elapsed.

12. A method as in claim 1, wherein the criterion is used memory.

13. A method as in claim 1, wherein the criterion is the number of operations completed.

14. A method as in claim 1, wherein the criterion is the number of tasks completed.

15. A method as in claim 1, wherein the processing elements feed information concerning the execution to the assignment manager no later than when the criterion is reached.

16. A method as in claim 1, wherein the processing elements feeding information concerning the execution to the assignment manager then extract available tasks for processing.

17. An apparatus for parallel processing, comprising:
    an assignment manager having coded therein a sequential schedule to determine priorities for processing;
    the assignment manager being responsive to live tasks available for scheduling according to priorities on the basis of the sequential schedule;
    the assignment manager being responsive to the highest priority live tasks that are available for scheduling available for processing;
    a plurality of task-extracting and task-executing processing elements respectively responsive to available tasks so that said processing elements execute tasks from the tasks extracted into each of the processing elements;
    said sequential schedule for determining of priorities in said assignment manager being independent of the execution of the executed tasks in the processing elements;
    said assignment manager having an operating criterion for governing execution of the extracted tasks in the processing elements; and
    said task-extracting and task-executing processing elements being responsive to said criterion and including a status feedback arrangement to said assignment manager in response to said criterion.

18. A method as in claim 1, wherein said selecting and assigning and making by the assignment manager overlap said extracting and executing by the processing elements, and neither the assignment manager nor the processing elements need wait for the other to become idle before the selecting and assigning and making by the assignment manager and said extracting and executing by the processing elements.

19. An apparatus as in claim 17, wherein in said processing elements spawn tasks during executing of extracted tasks and the tasks are given priorities in said assignment manager on the basis of the sequential scheduling.

20. An apparatus as in claim 17, wherein said assignment manager includes the sequential ordering in a depth-first (DF) schedule.

21. An apparatus as in claim 17, wherein said feedback arrangement places information on completed tasks in the assignment manager and on new live tasks generated by execution into a task in queue.

22. An apparatus as in claim 19, wherein said assignment manager responds to information on completed tasks and new live tasks in a task in queue and updates to remove records of completed tasks and include records of new live tasks.

23. An apparatus as in claim 19, wherein said feedback arrangement places in the task queue notification that the parallel program has completed.

24. An apparatus as in claim 17, wherein the assignment manager selects a depth first order as the sequential schedule used to determine priorities.

25. An apparatus as in claim 17, wherein the assignment manager places the live tasks a depth first order, and places records that mark these tasks as unblocked.

26. An apparatus as in claim 17, wherein the assignment manager determines which tasks are available for scheduling and not blocked.

27. An apparatus as in claim 17, wherein the assignment manager removes records of completed tasks and Includes records of new live tasks, marks said tasks awaiting a flag as blocked awaiting a flag and otherwise marks said tasks as unblocked, and marks as unblocked any tasks awaiting any of the new flags.

28. An apparatus as in claim 17, wherein thus criterion is time elapsed.

29. An apparatus as in claim 17, wherein the criterion is used memory.

30. An apparatus as in claim 17, wherein the criterion is the number of operations completed.

31. An apparatus as in claim 17, wherein the criterion is the number of tasks completed.

32. An apparatus as in claim 17, wherein the processing elements feed information concerning the execution to the assignment manager no later than when the criterion is reached.

33. An apparatus as in claim 17, wherein the processing elements feeding information concerning the execution to the assignment manager then extract available tasks for processing.

34. An apparatus as in claim 17, wherein the assignment manager responses overlap said processing elements responses, and neither the assignment manager nor the processing elements wait for the other to become idle before executing the tasks.

* * * * *